Aug. 13, 1946. J. J. VAN HORN Re 22,780
RAILWAY TRAFFIC CONTROLLING APPARATUS
Original Filed Sept. 25, 1941 9 Sheets-Sheet 1
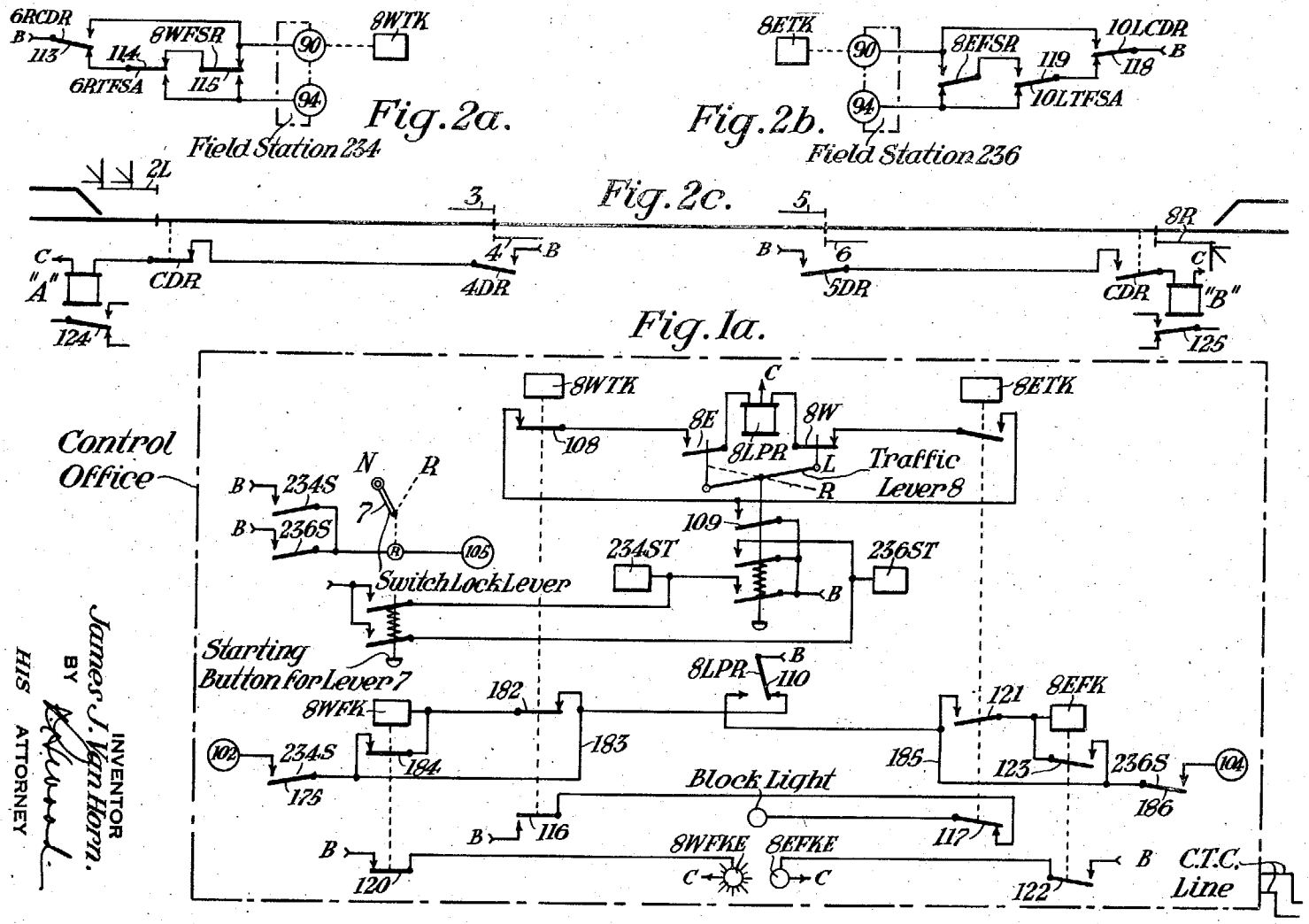
INVENTOR
James J. Van Horn.
BY
HIS ATTORNEY RAILWAY TRAFFIC CONTROLLING APPARATUS
Original Filed Sept. 25, 1941 9 Sheets-Sheet 2
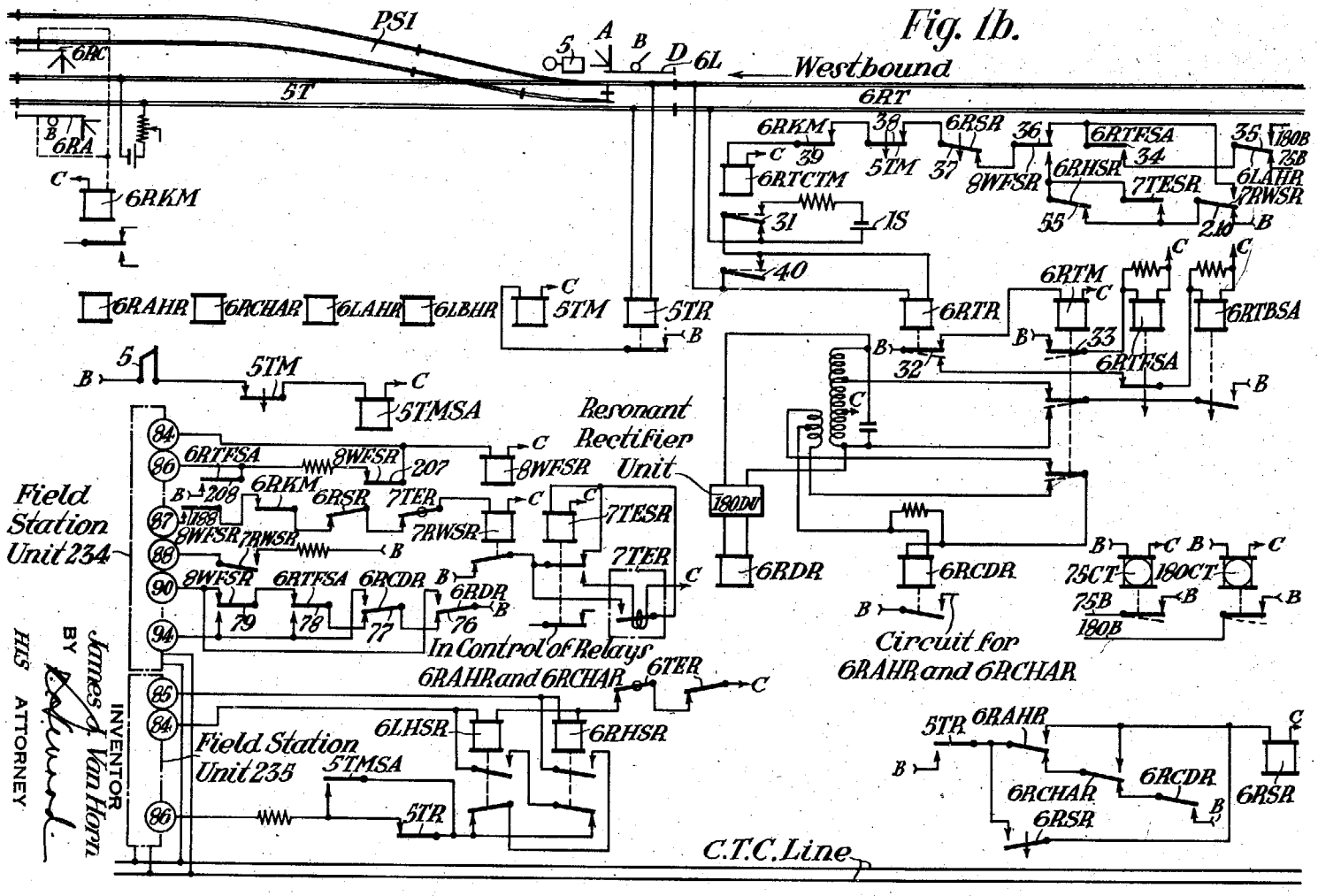
INVENTOR
James J. Van Horn
BY
HIS ATTORNEY RAILWAY TRAFFIC CONTROLLING APPARATUS
Original Filed Sept. 25, 1941 9 Sheets-Sheet 3
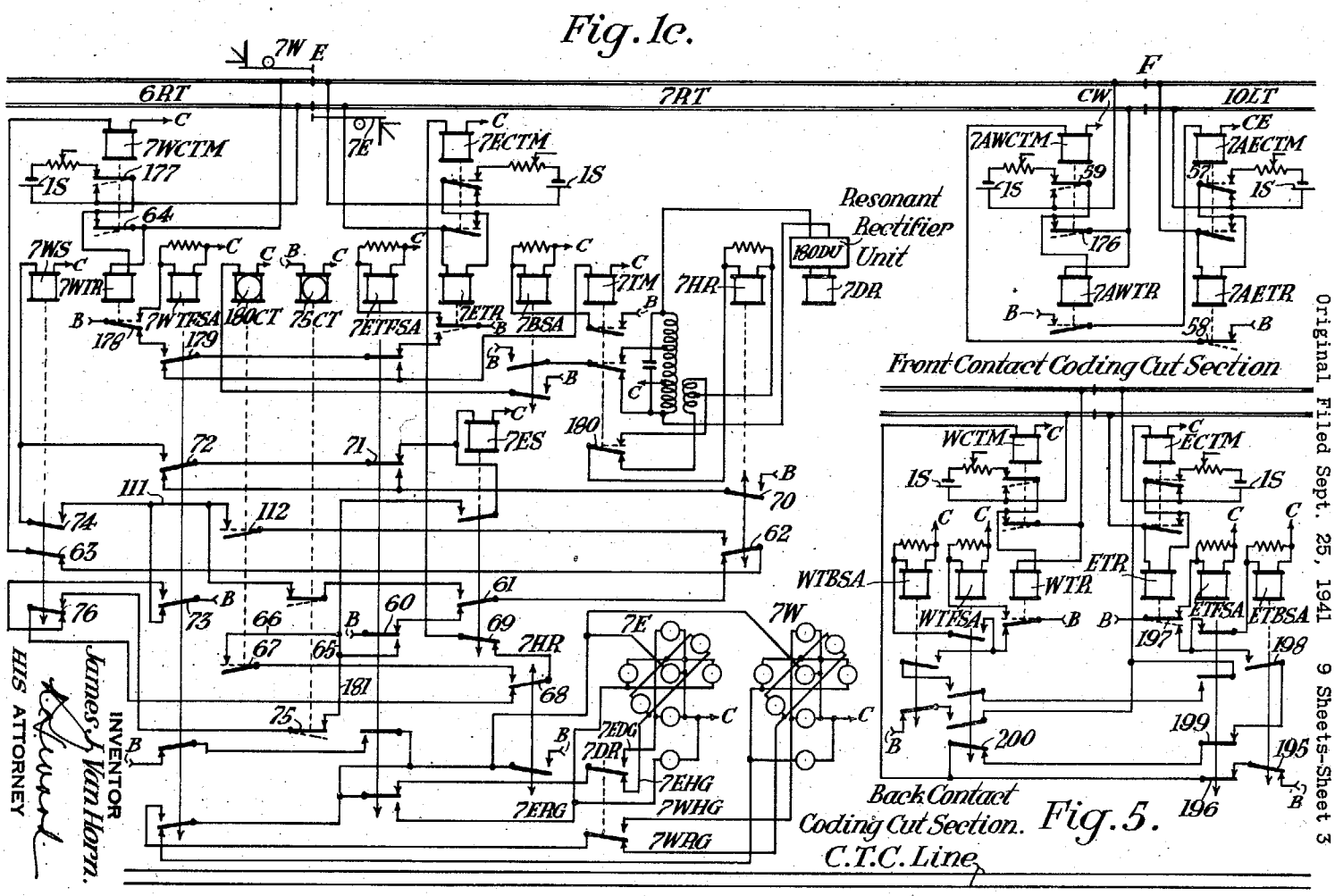

Aug. 13, 1946. J. J. VAN HORN Re 22,780
RAILWAY TRAFFIC CONTROLLING APPARATUS
Original Filed Sept. 25, 1941 9 Sheets-Sheet 4
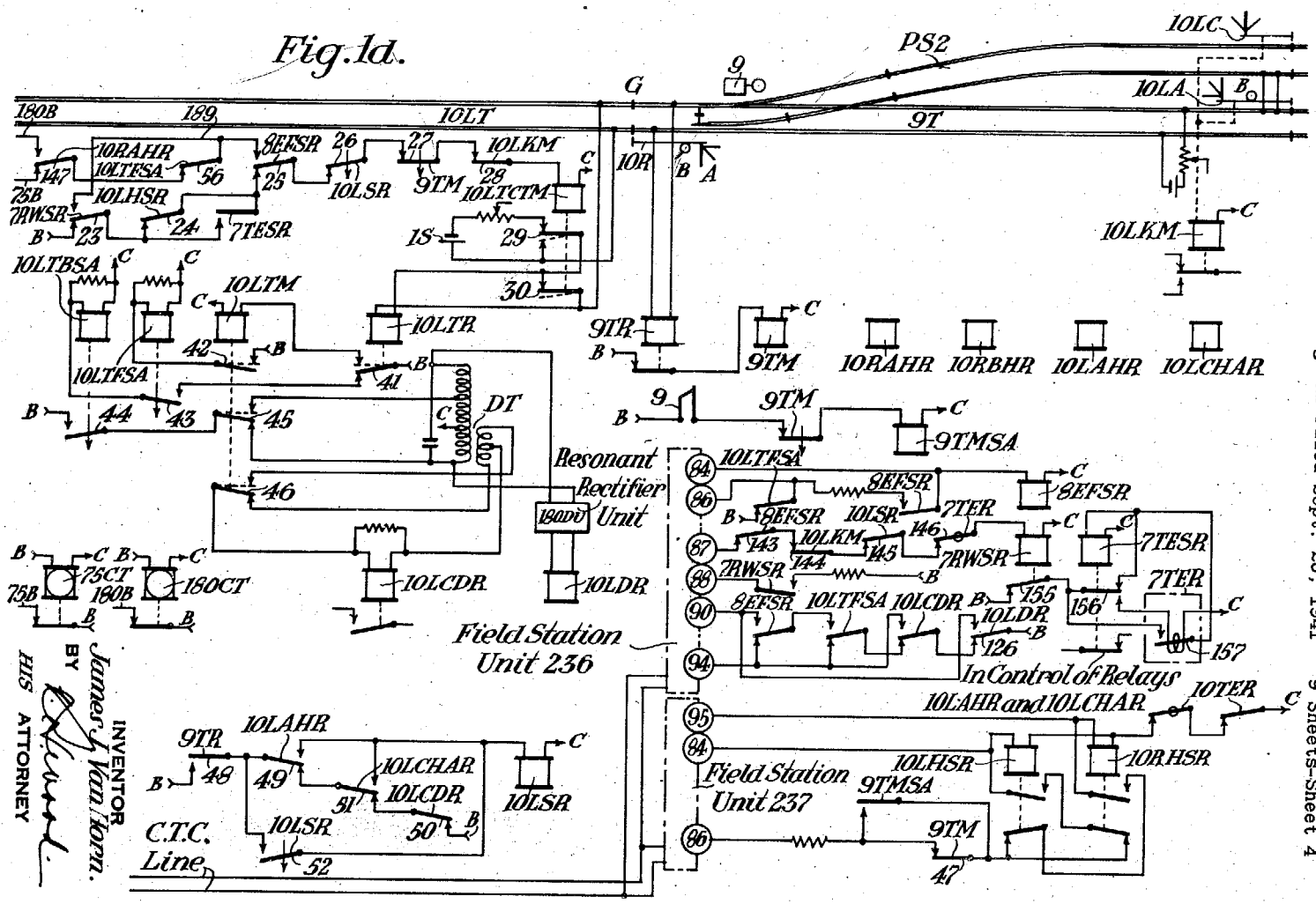
INVENTOR
James J. Van Horn.
BY
HIS ATTORNEY Aug. 13, 1946. J. J. VAN HORN Re 22,780
RAILWAY TRAFFIC CONTROLLING APPARATUS
Original Filed Sept. 25, 1941 9 Sheets-Sheet 5
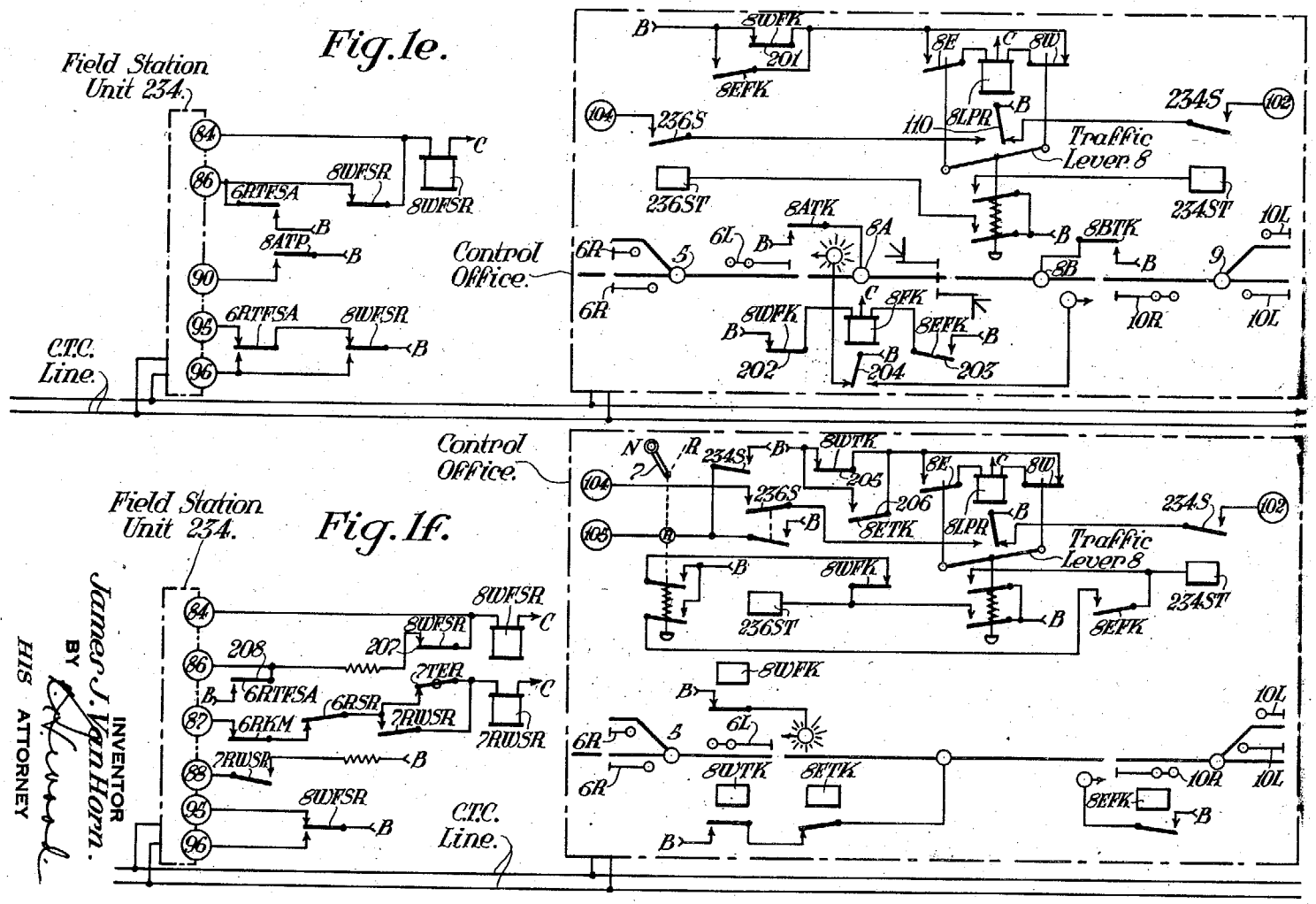
INVENTOR
James J. Van Horn.
BY
HIS ATTORNEY Aug. 13, 1946. J. J. VAN HORN Re 22,780
RAILWAY TRAFFIC CONTROLLING APPARATUS
Original Filed Sept. 25, 1941 9 Sheets-Sheet 6
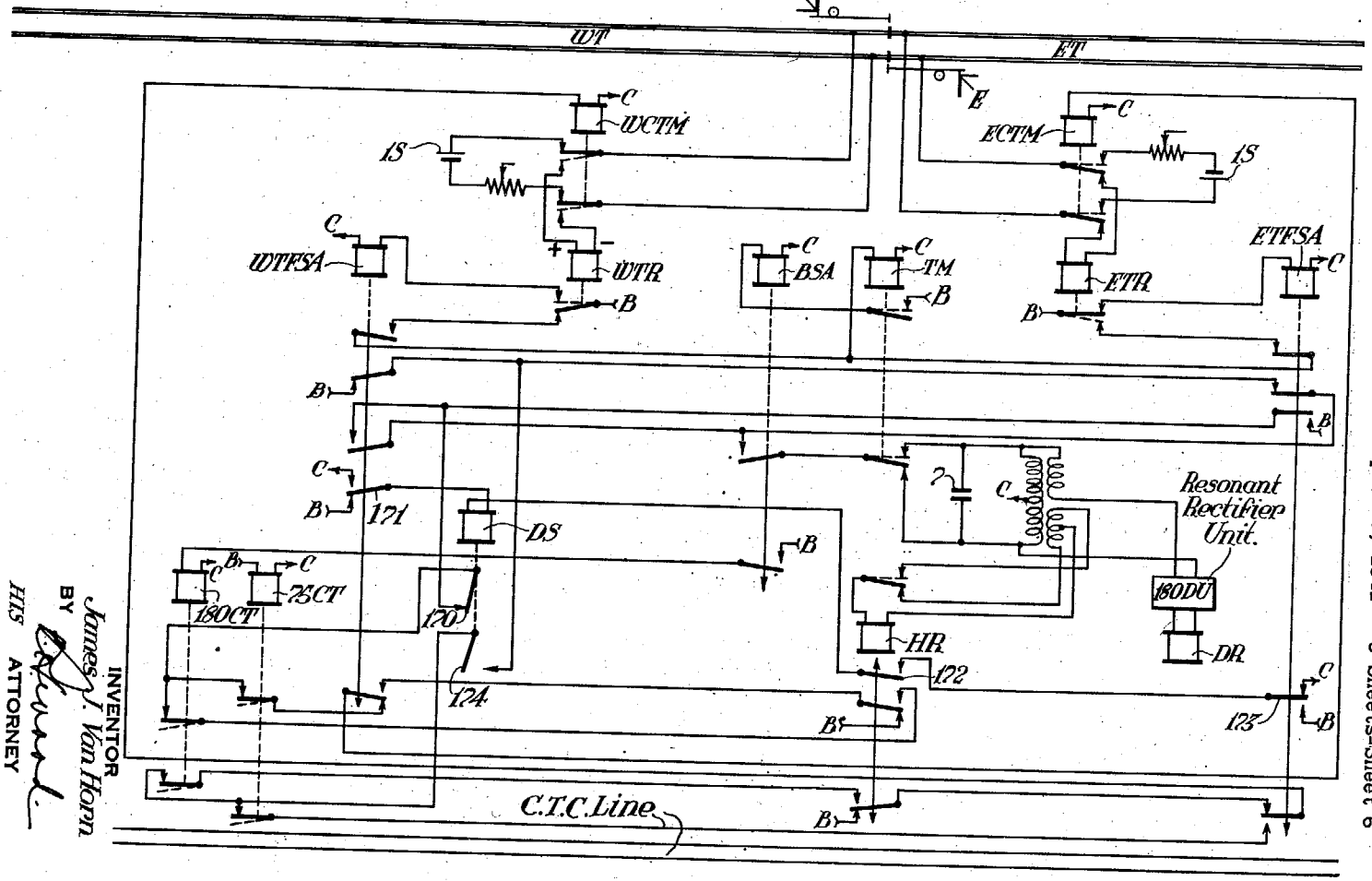
INVENTOR
James J. Van Horn
BY
HIS ATTORNEY Aug. 13, 1946. J. J. VAN HORN Re 22,780

RAILWAY TRAFFIC CONTROLLING APPARATUS

Original Filed Sept. 25, 1941 9 Sheets-Sheet 7

INVENTOR
James J. Van Horn.
BY
HIS ATTORNEY

RAILWAY TRAFFIC CONTROLLING APPARATUS

Original Filed Sept. 25, 1941 9 Sheets-Sheet 8

INVENTOR
James J. Van Horn.
BY
R. H. Ward
HIS ATTORNEY

Aug. 13, 1946. J. J. VAN HORN Re 22,780
RAILWAY TRAFFIC CONTROLLING APPARATUS
Original Filed Sept. 25, 1941 9 Sheets-Sheet 9
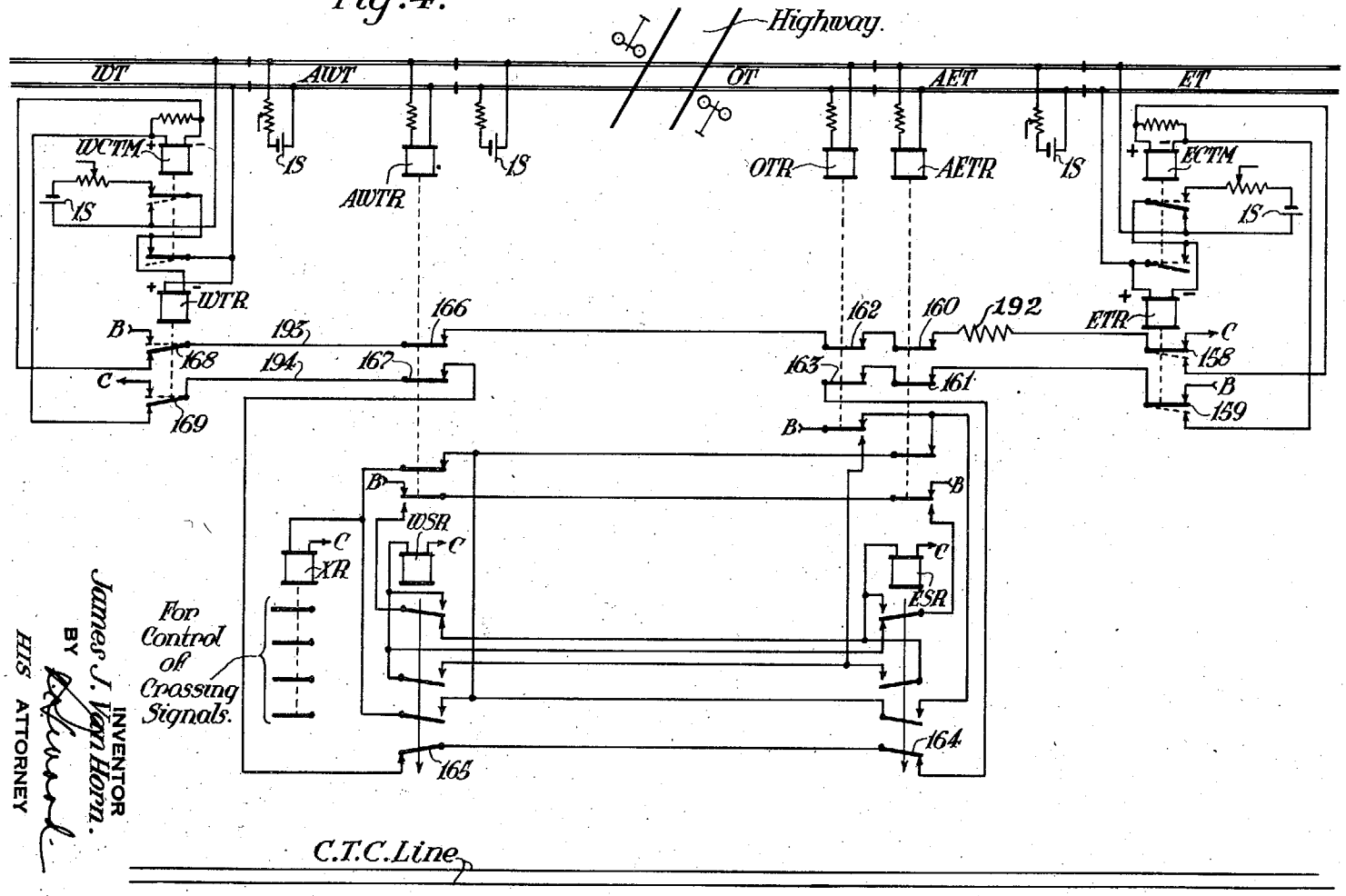
INVENTOR
James J. Van Horn.
BY
HIS ATTORNEY Reissued Aug. 13, 1946 Re. 22,780

UNITED STATES PATENT OFFICE 22,780

RAILWAY TRAFFIC CONTROLLING APPARATUS

James J. Van Horn, Pittsburgh, Pa., assignor to The Union Switch & Signal Company, Swissvale, Pa., a corporation of Pennsylvania Original No. 2,344,333, dated March 14, 1944, Serial No. 412,279, September 25, 1941. Application for reissue January 25, 1945, Serial No. 574,587

53 Claims. (Cl. 246—3)

Figure 3A:
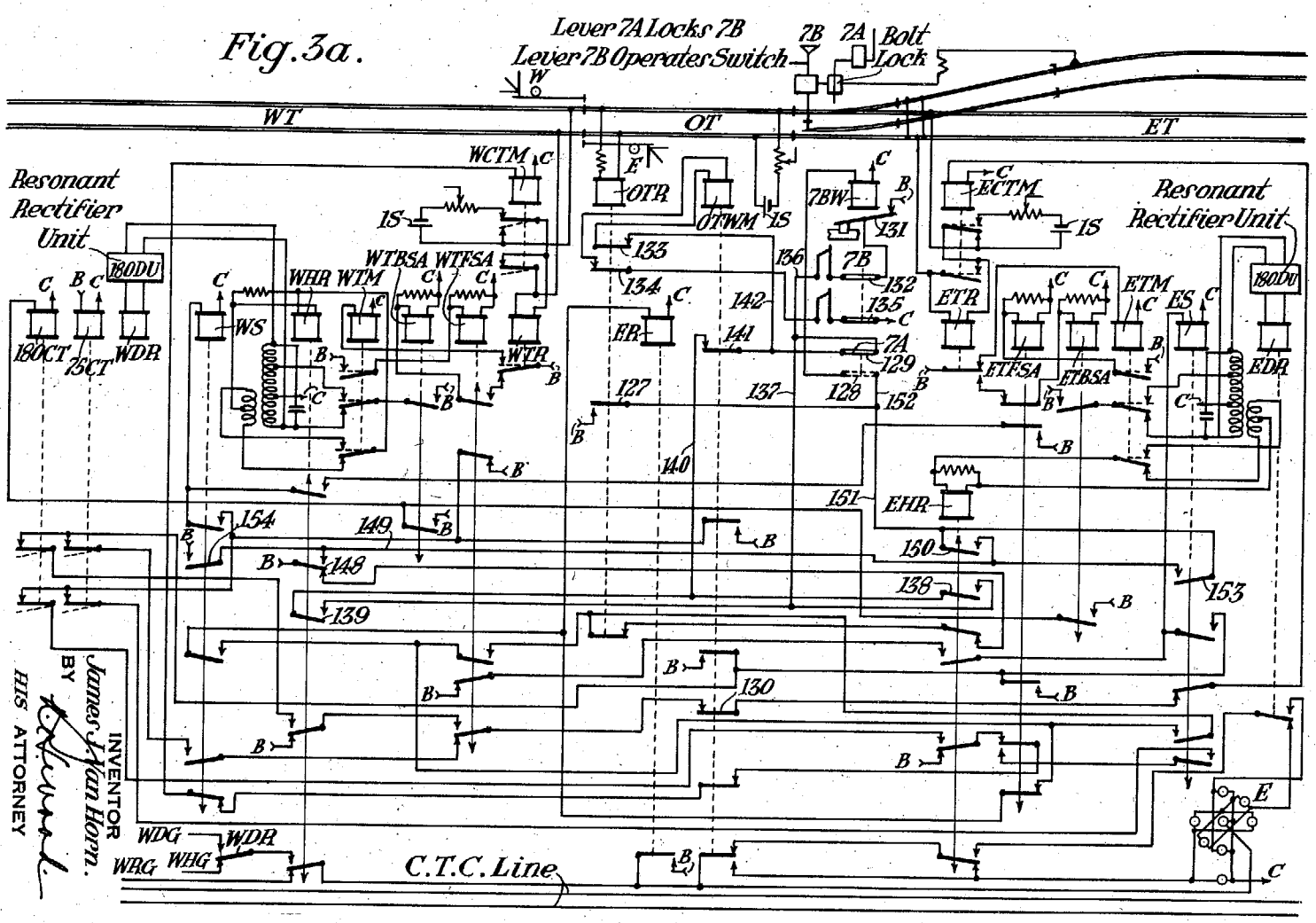

My invention relates to railway traffic controlling apparatus and is directed more particularly to the control of traffic in a single track, two-direction system of signaling wherein centralized traffic control or other suitable manual control is used for establishing the traffic direction. A distinguishing feature of my system is that normally, no code is supplied to the single track stretch, the only current in the track being that due to the steady energy which I employ for maintaining the established traffic direction and for other purposes. My system dispenses with all control line wires with the exception of the coded C. T. C. line circuit, if C. T. C. control is used, as will normally be the case, and with the exception of highway crossing control wherein I employ a line circuit to by-pass the steady energy and code around the highway crossing sections.

One object of my invention is to provide a non-line-wire system of the above type which will be normally deenergized except for the steady energy which is used in the track circuits for block detection. Another object of my invention is to establish the desired traffic direction when proper to do so merely by moving a traffic lever at a control office to a position corresponding with this direction, the checking and safety features of the system being brought into play automatically as a result of such movement. A further object of my invention is to provide certain intercontrols on the C. T. C. machine at the control office to prevent interference with the established traffic direction when the entrance signal is at proceed or the section is occupied by a train. A still further object of my invention is to provide a stick circuit for the traffic direction control relay at each end of the stretch, which is independent of the code equipment at the control office, whereby a traffic reversal cannot be accomplished from the control office unless the conditions in the trackway are proper for such reversal. A still further object of my invention is to provide for the proper control of highway crossing signals and electric switch locks in a system of the character disclosed herein. A further object of my invention is to provide a continuous block indication for the single track stretch. Other objects, purposes, and characteristic features of my invention will be apparent from the description which follows:

I accomplish the foregoing objects by: normally transmitting steady or uncoded energy over the single track stretch in the established traffic direction to check unoccupancy of the stretch and to provide traffic locking whereby the absence of steady energy prevents a reversal of the traffic direction; removing the latter steady energy and transmitting coded current over the stretch from the new exit end to the new entrance end to provide block control for the entrance signal; reapplying steady energy behind the train to reset the track circuits to their normal condition; reclearing the entrance signal to discontinue the steady energy so as to permit a following move; detecting the exit of a train by means of the steady energy received at the exit end following a train movement before a traffic reversal can be made; employing a back contact of the steady energy detecting relay (FSA) in the stick circuit for the traffic direction control relay (FSR) so that the latter relay is independent of the control office and cannot be operated therefrom if steady energy is absent from the track stretch; employing only one pair of control line wires to provide a simple but effective highway crossing application of the apparatus embodying my invention; employing frequency code of different code rates for providing a continuous block indication where the stretch includes one or more pairs of intermediate signals; employing back contact coding for effectively relaying the steady energy and code at cut sections; and providing a simple yet effective form of electric switch lock control without line wires.

The present invention is an improvement on the inventions disclosed in my copending United States application, Serial No. 410,504, filed on September 12, 1941, and the copending United States application, Serial No. 411,481, filed on September 19, 1941, by Crawford E. Staples, both for Railway traffic controlling apparatus.

I shall describe several forms of apparatus embodying my invention, and shall then point out the novel features thereon in claims.

Figure 3B:
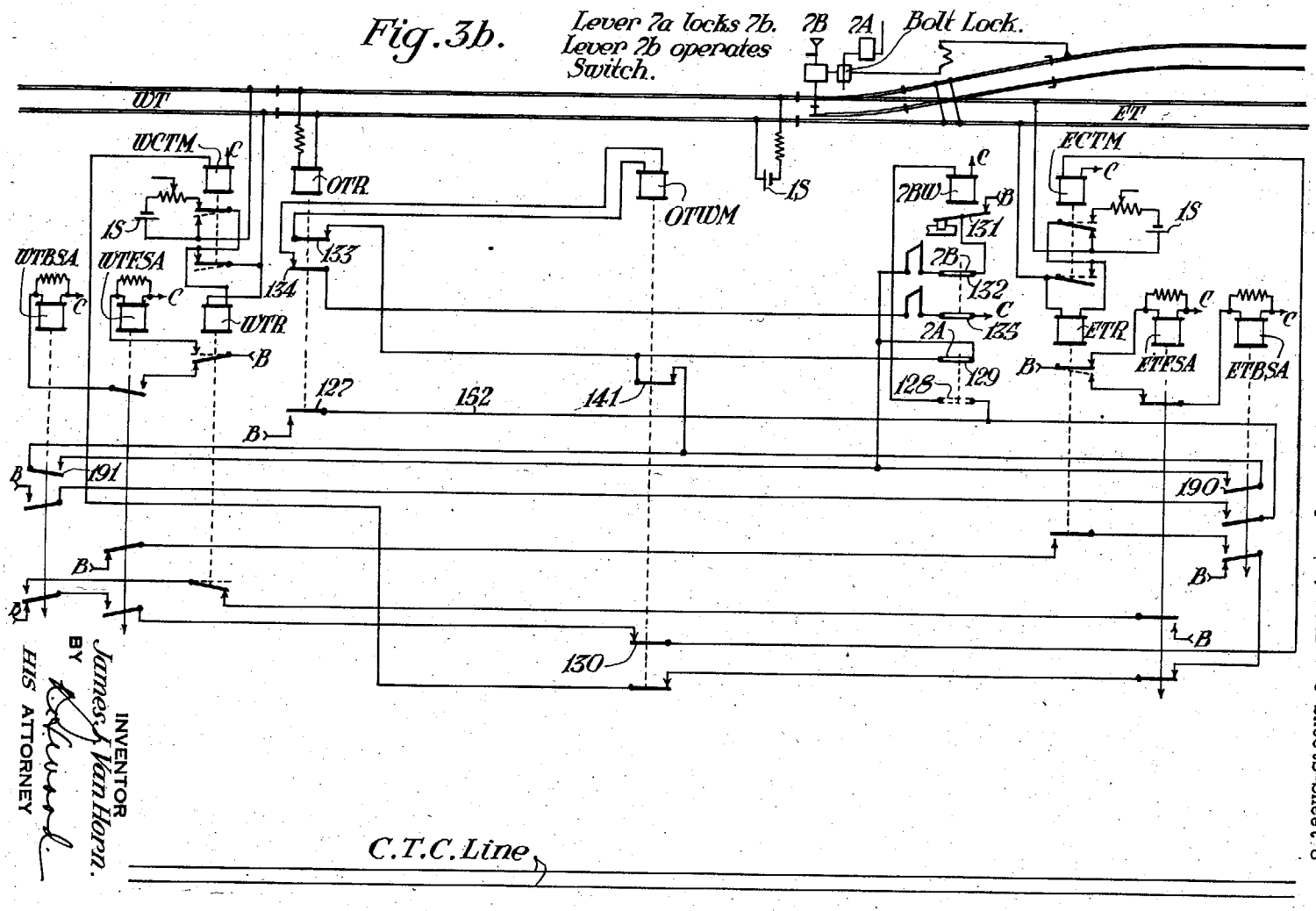

In the accompanying drawings, Figs. 1*a*, 1*b*, 1*c*, and 1*d* taken together, with Fig. 1*a* at the left, are a diagrammatic view showing one embodiment of my invention as applied to a stretch of single track railway extending between the passing sidings PS1 and PS2 at the two ends of the stretch, Fig. 1*a* being the control office for this stretch. Figs. 1*e* and 1*f* are diagrammatic views showing modified forms of the office equipment shown in Fig. 1*a* also embodying my invention. Fig. 1*g* is a diagrammatic view embodying my invention, showing a modification of a portion of the apparatus of Fig. 1*c* in which a polar directional stick relay replaces the two neutral directional stick relays of Fig. 1*c*. Figs. 2*a*, 2*b*, and 2*c*, are diagrammatic views showing modified forms of the block indication apparatus of Fig. 1*a*, and also embodying my invention. Fig. 3*a* is a diagrammatic view showing the apparatus for electric switch lock control embodying my invention and represents the modification of the apparatus of Fig. 1 which would be required at an intermediate signal location. Fig. 3*b* is a diagrammatic view similar to Fig. 3*a* but adapted for a cut section location, and also embodying my invention. Fig. 4 is a diagrammatic view showing the adaptation of the apparatus for a highway crossing location, also embodying my invention. Fig. 5 is a diagrammatic view embodying my invention and showing a modification of a portion of the apparatus of Fig. 1*c* in which back contact coding apparatus replaces the front contact coding apparatus at the cut section of Fig. 1*c*.

Similar reference characters refer to similar parts in each of the several views.

Referring first to Figs. 1*a*—1*d*, inclusive, the stretch of track between the passing sidings PS1 and PS2 is divided by means of the usual insulated rail joints at locations D, E, F, and G into a number of track circuit sections. Each of these track sections is identified by the reference character T with a distinguishing prefix which also identifies the apparatus associated with that section. The signals which govern traffic movements through the single track stretch are the headblock signals 6 and 10 at the respective ends of the stretch and the intermediate signal 7 at location E. The cut-section location F could likewise be provided with a signal, if desired, by adding apparatus similar to that shown at the intermediate signal location E.

Each section of the single track stretch is, in reality, provided with two track circuits, one eastbound and one westbound, each of which includes a code following track relay TR at one end and a source of track circuit energy, conveniently shown as a battery, at the other end. The track circuits could obviously be of the alternating current type and my invention contemplates such track circuits, the direct current type being shown only for purposes of simplicity. The track circuit current is properly coded under the influence of traffic conditions, or as initiated by the operator at the central control office shown diagrammatically in Fig. 1*a*. Depending upon the direction of traffic movement, only one or the other track circuit is effective at any one time as will become clear hereinafter. The control relays involved in an eastbound move generally carry the prefix E or R (for right-hand) and those which control westbound moves include the prefix W or L (for left-hand) in order to make the disclosure more easy to follow.

For simplicity, I make use of but two codes, these comprising direct current periodically interrupted at the rate of 75 times per minute for "approach" and 180 times per minute for "clear" signal indications. The coding is accomplished by means of suitable code transmitters 75CT and 180CT which are well known. It is understood that for cab signaling purposes, alternating current coded over the contacts of these code transmitters could be superimposed on the direct current track circuits, but this added complication is unnecessary for an understanding of my invention. Following moves are provided for by means of directional stick relays and once traffic is established in a given direction, no further action on the part of the operator other than clearing of the entrance signal is required for permitting entry of a following train.

The relays 8WFSR and 8EFSR adjacent the two ends of the stretch are manually controlled traffic direction selecting relays which govern the direction of traffic movement through the the stretch. The communication system by means of which the operator at the C. T. C. machine in the control office (Fig. 1*a*) may govern these relays may be of any suitable type, but preferably it is of the selective or code type in which communication is established intermittently by means of impulse codes transmitted over a single pair of line wires to the desired control location or field station. The details of such a communication system do not enter actively into the present invention and it is deemed sufficient for an understanding of the present invention to point out that the traffic direction from right to left or westbound is established by moving the traffic lever 8 (Fig. 1*a*) to the left-hand or L position so as to transmit a suitable code for energizing the traffic direction control relay 8WFSR in the field station apparatus at the left-hand end of the stretch. It is understood that the communication system may also be used to govern the traffic leaving the single track stretch at either end by controlling the signals at such ends, and will also be used to provide an indication of traffic and apparatus conditions within the stretch, as well as to prevent interference with or reversal of the established traffic direction except under proper conditions, as will be pointed out hereinafter. One form of communication system suitable for use in my system is that shown in Letters Patent of the United States No. 2,229,249, granted to Lloyd V. Lewis on January 21, 1941, for Remote control system, and the general designation of the relays comprising the C. T. C. portion of my system, and the numbering of the terminal wires which are used to perform analogous functions, corresponds with that used in this patent.

I shall first describe the general features of operation of the apparatus embodying my invention and shall then describe the operation more in detail. It will be assumed, for simplicity, that the stretch does not include an intermediate signal and that the last traffic movement was westbound so that lever 8 occupies its L position, causing the westbound traffic relay 8WFSR to remain energized and the eastbound traffic relay 8EFSR to be deenergized. With the westbound entrance signal 10L at stop, as shown, steady or uncoded energy flows from the east end (entrance end location G) over the intervening track sections to the west end (exit end, location D) where it is used for the control of the unoccupied block indication light, shown in Fig. 1*a*. I shall assume that it is desired to permit a westbound train to enter the stretch. When this indication is received at the control office, a control code may be transmitted to pick up a home stick relay (10LHSR) so as to initiate the operation of clearing the entrance signal 10L. When this control code is received and relay 10LHSR picks up, the steady energy is removed from the track circuit 10LT and from the remaining track circuits of the stretch, in succession. Removal of the steady energy is detected at the exit end and this permits code to be cascaded from the exit end D to the entrance end G to provide the block control for the intermediate and entrance signals, whereupon the entrance signal will be cleared and the westbound train may enter. As the train passes signal 10L, the block light at the control office will light up, to indicate the occupied condition. The coded energy will continue to be fed to the single track stretch after the train accepts the signal and enters the stretch, until after the stretch is vacated. It is understood, of course, that the coded energy will be cut off in the rear of the train in order to provide the usual following protection. When the train clears the stretch, coded energy will again be cascaded to the entrance end and will cause deenergization of the stick relay used for following moves, whereupon steady energy will again be applied at the entrance end unless in the meantime a C. T. C. code has been transmitted to reclear the entrance signal.

In order to reverse the traffic direction from westbound to eastbound, steady energy must first be detected at the west end (location D) of the block which permits deenergization of relay 8WFSR and energization of relay 8EFSR following a reversal of lever 8 to the R position and the transmission of the necessary C. T. C. codes for this purpose. When the eastbound traffic direction is established, steady energy will again be present in the track sections of the stretch, as for the westbound traffic direction but this steady energy will now be transmitted in the direction from west to east. Transmission of a C. T. C. code to clear the eastbound headblock signal 6R will remove the steady energy and so will initiate the supply of coded energy from the east end (location G) to the new entrance end (location D) in the manner described above for permitting signal 6R to clear so that eastbound traffic may enter the stretch.

Having described the general features of operation, I shall next describe more in detail the sequence of operations occuring when traffic is established in a given direction, assumed to be westbound for purposes of explanation. The basic operation can be most easily understood by first connecting Figs. 1*a* and 1*b* directly with Fig. 1*d* to eliminate the complication of the intermediate signal location and the cut section apparatus.

With the entrance signals 6R and 10L which govern moves into the single track stretch at stop, and with traffic lever 8 in its L position for a westbound movement, the apparatus will be in the condition shown in the drawings wherein the westbound traffic direction control relay 8WFSR will be energized and the opposing or eastbound traffic direction control relay 8EFSR will be deenergized. At location G, relay 10LTCTM will be steadily energized over a circuit which includes the back point of contact 23 of relay 7RWSR the function of which will be explained hereinafter, back contact 24 of the home stick relay 10LHSR which controls signal 10L, back point of contact 25 of the eastbound traffic direction control relay 8 EFSR, back contact 26 of relay 10LSR which is the stick relay for signal 10L and picks up when the train passes this signal at any proceed indication, front contact 27 of the track repeater relay 9TM which is picked up when the short entrance section 9T is unoccupied, and front contact 28 of relay 10LKM which checks the stop position of signal 10L and is picked up when this signal is at stop. Steady energy from the direct current source 1S is thus applied across the rails at the westbound entrance end over the front point of contact 29 and front contact 30 of relay 10LTCTM which now remains constantly picked up. Accordingly, relay 6RTR at the exit end is maintained steadily energized over the back point of contact 31 of relay 6RTCTM which is deenergized at this time. Relays 6RTM and 6RTFSA will be continuously energized over the front contacts 32 and 33 of relays 6RTR and 6RTM, respectively. The circuit for relay 6RTCTM will, of course, be open at the back contact 34 of relay 6RTFSA. The presence of steady energy at the westbound exit end D provides the unoccupied block indication (Fig. 1*a*) and makes it possible for the operator to transmit a control code to clear the entrance signal 10LA or 10LC.

When the operator transmits this signal-clearing code, he will energize the signal control relay 10LHSR (Fig. 1*d*) through the code equipment at the field station (237) and will thus interrupt the steady energy circuit previously traced for relay 10LTCTM at back contact 24 of relay 10LHSR. The signal cannot, however, be cleared until code from the exit end is transmitted over the track and is received at the entrance end, as will appear more clearly hereinafter. Steady energy will now be removed at the entrance end. Absence of steady energy at the exit end will result in the release of relays 6RTR, 6RTM, and 6RTSFA at that end, whereupon a coding circuit for relay 6RTCTM will be completed over the back contact 34 of relay 6RTFSA, now closed. Relay 6RTCTM will follow either 75 or 180 code, depending on whether the home relay 6LAHR for signal 6L is deenergized or energized, respectively. As shown in the drawings, this relay is deenergized so that the 75 code circuit for relay 6RTCTM will include the back point of contact 35 of relay 6LAHR, back contact 34 of relay 6RTFSA (now closed), front point of contact 36 of relay 8WFSR, back contact 37 of relay 6RSR, front contact 38 of relay 5TM, and front contact 39 of relay 6RKM. Relay 6RTCTM follows the 75 code and applies this code to the exit end D over the front points of its contacts 31 and 40.

Looking again at the entrance location G, relay 10LTCTM at this location is deenergized so that the code following track relay 10LTR is continuously connected across the rails over the back point of contact 29 of that relay and so will follow the code supplied at the other end of the stretch. Relay 10LTM which is controlled over the front point of contact 41 of relay 10LTR and is of the code following type will likewise follow the code and will cause the energization of the front contact repeater relay 10LTFSA over its front contact 42. The back contact repeater relay 10LTBSA will likewise be energized over the back point of contact 41 of relay 10LTR and the front contact 43 of relay 10LTFSA. Relay 10LTBSA serves as an approach energizing relay for the decoding circuit of the decoding transformer DT which now becomes energized over the front contact 44 of relay 10LTBSA and the coding contact 45 of relay 10LTM. Code detecting relay 10LCDR will now become energized from the output of the decoding transformer over the rectifying contact 46 of relay 10LTM, in the usual manner. Since relay 10LCDR is energized, the circuit for clearing signal 10LA or 10LC may be completed in the usual and well-known manner.

When the train passes signal 10L, relay 10LHSR (Fig. 1*d*) will become deenergized due to opening of front contact 47 of relay 9TM in its stick circuit so that if no additional lever manipulation involving this stretch is made, 75 code will be applied to section 6RT as soon as the train vacates this section, in order to permit following moves to be made. Relay 10LTR will again respond to this code and will energize relay 10LCDR, as before, thus deenergizing the directional stick relay 10LSR at back contact 50 of relay 10LCDR. The westbound stick relay 10LSR will have been picked up over the back contact 48 of relay 9TR and the front point of contact 49 of relay 10LAHR. The stick circuit for relay 10LSR includes back contact 50 of relay 10LCDR, back points of contacts 51 and 49 of relays 10LCHAR and 10LAHR, and front contact 52 of relay 10LSR. The release of relay 10LSR completes the pick-up circuit for relay 10LTCTM at back contact 26 whereupon this relay now becomes steadily energized over the circuit previously traced. The continuous energization of relay 10LTCTM causes steady energy to be applied to the westbound entrance end G, whereupon relay 6RTR will become energized during off intervals of the code which is being supplied at the westbound exit end D. That is to say, the steady energy will feed through during the off intervals in the code. Energization of relay 6RTR causes energization of relays 6RTM and 6RTFSA, as before, whereupon relay 6RTCTM will become deenergized due to the opening of back contact 34 of relay 6RTFSA, and will remain in this condition until signal 10L is recleared or until a traffic reversal is initiated.

Summarizing the operation described thus far, the receipt of steady energy at the exit end permits initiation of the clearing operation for the entrance signal in which the steady energy is cut off at the entrance end and when this effect reaches the exit end, coded energy is applied at that end and is detected at the entrance end. Presence of code at the entrance end permits completion of the clearing operation for the entrance signal.

A train entering the stretch provides for following moves by picking up a directional stick relay. When the train vacates the stretch, code is reapplied at the exit end, releasing the directional stick relay which reapplies steady energy at the entrance end. This steady energy feeds through the code and when detected at the exit end, cuts off the code at that end so that the apparatus is restored to its normal condition.

I shall now describe the manner in which a reversal of traffic direction from westbound to eastbound is accomplished, still assuming that no intermediate signals are present so that Figs. 1*a*, 1*b*, and 1*d* only are used.

With relay 6RTR steadily energized due to the presence of westbound steady energy in the stretch, relay 6RTFSA will be energized and code detecting relays 6RCDR and 6RDR will be deenergized. Since the last traffic movement was westbound, the traffic direction relay 8WFSR will be energized so that a circuit will be completed for energizing terminal 90 of the field station unit (234) (Fig. 1*b*). This circuit includes the back points of contacts 76 and 77 of relay 6RDR and 6RCDR, respectively, and the front points of contacts 78 and 79 of relays 6RTFSA and 8WFSR, respectively. Energization of terminal 90 of the field station unit results in the transmission of a C. T. C. code to the control office in a manner which will be clear from the Lewis patent. This code will cause the westbound block indicator relay 8WTK to become energized. With this relay energized, the direction of traffic may be reversed by a movement of the traffic lever 8 to its right-hand position in which contact 8E is closed and contact 8W is opened. When this lever movement is made, a circuit is completed to one winding of the polarized relay 8LPR over the front contact 109 which closes during the initial movement of the lever, front contact 108 of relay 8WTK and the lever contact 8E of lever 8. When polar contact 110 of relay 8LPR moves to its left-hand position corresponding to this energization, a control code will be transmitted to the field station unit (236, Fig. 1*d*) to energize the eastbound direction control relay 8EFSR. The initial movement of lever 8 caused the starting relays 236ST and 234ST to become energized so that corresponding codes were transmitted to the field station units, as is well known in C. T. C. practice as exemplified in the Lewis patent. The code resulting from energization of the starting relay 236ST caused the pick-up of the eastbound direction control relay 8EFSR, as just described. The code transmitted by virtue of the energization of the starting relay 234ST caused the release of the westbound direction contral relay 8WFSR. Relay 8WFSR will release due to the interruption of the circuit to terminal 102 which extends through contact 175 of relay 234S, at the polar contact 110 of relay 8LPR, now reversed so that contact 110 occupies its left-hand position.

It will be observed that if relay 8EFSR becomes energized before relay 8WFSR is released (which may happen due to the fact that codes must necessarily be transmitted to the different field station units in succession) the energization of relay 8EFSR will cause relay 10LTCTM to respond to code instead of steady energy. Accordingly, coded energy will be applied instead of steady energy at the new entrance end (location G) and the code will be detected by relays 6RTR, 6RTM, 6RTFSA, and 6RTBSA, at location D. Since relay 6RTFSA is thus continued in its energized position, no change in the traffic set-up at location D will occur until relay 8WFSR is subsequently deenergized. When this occurs, relay 6RTCTM will be continuously energized over the circuit which includes the back point of contact 210 of relay 7RWSR, back contact 55 of relay 6RHSR, back contacts 36 and 37 of relays 8WFSR and 6RSR, respectively, and front contacts 38 and 39 of relays 5TM and 6RKM, respectively. Since relay 6RTCTM is now steadily energized, it disconnects relay 6RTR from the track at the back point of its contact 31 and thereby releases relays 6RTM, 6RTFSA and 6RTBSA. Steady energy will now be applied at the new entrance end (location D) for the eastbound traffic direction over the front point of contact 31 of relay 6RTCTM so as to energize relay 10LTR at the new exit end (location G). At the same time, coded energy is being applied at this new exit end.

During the off interval of the code to which relay 10LTCTM is responding, relay 10LTR will be connected across the track and will respond to the steady energy, energizing relays 10LTM and 10LTFSA, in sequence. The energization of relay 10LTFSA will deenergize relay 10LTCTM at its back contact 56 so that coded energy will be removed from the east end (G) of the stretch. Steady energy will continue to be supplied at the west end (D) until signal 6R is cleared for the eastbound move, whereupon steady energy will be removed because of the energization of relay 6RHSR which has a back contact 55 included in the steady energy supply circuit for relay 6RTCTM.

If relay 8WFSR becomes deenergized before relay 8EFSR picks up, then relay 6RTCTM will be energized on steady energy and will impress steady energy on the track at location D. This steady energy will oppose the steady energy impressed on the track by relay 10LTCTM at location G, but this will have no adverse effect. As soon as relay 8EFSR picks up, relay 10LTCTM will have its energization changed from steady to coded, thus permitting relay 10LTR to become energized on the first "off" interval of the code, with the consequent energization of relays 10LTM and 10LTFSA. Pick-up of relay 10LTFSA will deenergize relay 10LTCTM and so will discontinue the supply of coded energy to the track. The track will now have steady energy alone flowing in the rails from the new entrance end D to the new exit end G. From this point on, the establishment of the eastbound traffic direction will be clear from the analogous description already presented for the westbound traffic direction.

Having described the basic operation employing Figs. 1*a*, 1*b* and 1*d*, I shall now describe the operation taking place when the single track stretch includes an intermediate signal location and a cut section location. For this purpose, Fig. 1*c* is inserted between Figs. 1*b* and 1*d* of the drawings. To avoid unnecessary duplication, the present description will be confined as much as possible to the apparatus of Fig. 1*c*.

With traffic assumed to be established in the westbound direction, as before, and the stretch unoccupied, steady energy is fed in the direction of traffic from location G to location D. When this steady energy is received at location F, relay 7AETR will be energized over the back point of contact 57 of relay 7AECTM and will energize relay 7AWCTM over its front contact 58. Relay 7AWCTM will apply steady energy from the track battery 1S to section 7RT over the front point of its contact 59 and front contact 176. At the intermediate signal location E, the steady energy will energize relay 7ETR as well as relays 7ETFSA and 7WCTM. All other relays at this location (except the code transmitters) will be deenergized. The circuit for relay 7WCTM includes the front point of contact 60 of relay 7ETFSA, the back points of contacts 61 and 62 of relays 7ES and 7HR, respectively, and the back contacts 63 of relay 7WS. Steady energy is repeated into the section 6RT over the front point of contact 177 and the front contact 64 of relay 7WCTM. Accordingly, the manner in which steady energy can be readily transmitted around a cut section location as well as an intermediate signal location in the system embodying my invention will be readily apparent.

I shall next describe how a control is established for clearing the entrance signal 10L for a westbound move. Energization of the stick relay 10LHSR to clear one of the 10L signals removes the steady energy from the westbound entrance end at location G and causes the deenergization of relays 7ETR, 7ETFSA and 7WCTM at the intermediate signal location E. Steady energy will consequently be removed from section 6RT so that relay 6RTR will also release. The absence of steady energy at location D will cause coded energy to be applied to section 6RT, due to the release of relay 6RTFSA, as explained hereinbefore. This coded energy will be detected by the code following operation of relay 7WTR and by the energization of relays 7WTFSA, 7TM, 7BSA, 7HR and 7WS, if the code is 75. Relay 7WTFSA will remain steadily picked up, as will relays 7BSA, 7HR, and 7WS. Relay 7TM is a code following relay which is now energized over the back point of coding contact 178 of relay 7WTR and the front point of contact 179 of relay 7WTFSA. The code operation of relay 7TM will accordingly energize the code detecting relay 7HR over the rectifying contact 180. The circuit for relay 7WS includes front contact 70 of relay 7HR, back point of contact 71 of relay 7ETFSA, and the front point of contact 72 of relay 7WTFSA. If the code supplied to section 6RT is 180, the 180 code detecting relay 7DR will also be energized so that signal 7W will then display either an approach or a clear indication, depending on the code.

Relay 7ECTM will now follow 180 code and will apply energy of this code frequency to the section 7RT and when the 180 code is detected at location G, signal 10L will be permitted to display a clear indication. The circuit for relay 7ECTM under this condition will include the back point of contact 60 of relay 7ETFSA, wires 65 and 66, contact 67 of coder 180CT, front point of contact 68 of relay 7HR, and back contact 69 of the opposing directional stick relay 7ES. Now, when the train passes signal 7W, shunting out relay 7WRT, all of the relays 7WTFSA, 7TM, 7BSA, 7HR and 7DR will become deenergized. The westbound directional stick relay 7WS is slow in releasing and so will establish an obvious stick circuit for itself over the back point of contact 73 of relay 7WTFSA and its own front contact 74. Relay 7ECTM will now follow 75 code, its coding circuit including the back point of contact 60 of relay 7ETFSA, wire 181, code contact 75 of the coder 75CT, front point of contact 76 of relay 7WS, back point of contact 68 of relay 7HR, and back contact 69 of relay 7ES. Accordingly, 75 code is applied by relay 7ECTM to the section 7RT, although this code is as yet ineffective in this section due to occupancy by the train.

When the train vacates section 7RT, the 75 code will cause operation of relay 10LTR at location G so that the code detecting relay 10LCDR will be energized. Energization of this relay will open the circuit of the stick relay 10LSR (which became energized when the train passed signal 10L) to provide a control for permitting a following move to be made into the occupied stretch. Deenergization of relay 10LSR will permit the energization of relay 10LTCTM on steady energy over the previously traced circuit, provided one of the 10L signals is not to be re-cleared. The steady energy applied at location G will feed through the code to location E and will be detected during the off intervals of the code by relays 7ETR and 7ETFSA at the intermediate signal location. The energization of relay 7ETFSA opens the coding circuit for relay 7ESTM which was just traced, at the back point of contact 60, thus removing coded energy from section 7RT.

It will be noted that the steady energy which is applied at location G cannot be relayed to the other end D of the stretch until coded energy has been received from such other end to deenergize the westbound directional stick relay 7WS which has a back contact 63 in the energizing circuit for relay 7WCTM. The deenergization of relay 7WS will take place when the train clears the sections 6RT and 5T between signals 7W and 6R, whereupon coded track energy will be applied at location D and will result in the energization of relays 7WTR and 7WTFSA, thus interrupting the stick circuit for relay 7WS at the back point of contact 73 of relay 7WTFSA. When relay 7WS closes its back contact 63, relay 7WCTM will become steadily energized over a circuit which includes the front point of contact 60 of relay 7ETFSA, back points of contacts 61 and 62 of relays 7ES and 7HR, respectively, and the back contact 63 of relay 7WS.

During the time that a westbound train is between the signals 7W and 6R, a following move may be made by reenergizing relay 10LHSR at location G through the C. T. C. system, thus removing the steady energy from the track sections between signals 7E and 10R. Now, with relay 7WS energized, relay 7ECTM will follow 75 code and will apply this code to sections 7RT and 10LT. The energizing circuit for relay 7ECTM will be the same as previously traced in connection with the passage of a westbound train beyond signal 7W. The detection of the 75 code at location G will permit one of the 10L signals to display an approach indication for the following train, as will be obvious.

I shall next describe the operations involved in a reversal of traffic when the stretch includes an intermediate signal location. In connection with this reversal of the traffic direction from westbound to eastbound, reference will be had to the apparatus at the control office or C. T. C. machine shown in Fig. 1*a*. To accomplish the reversal of the traffic direction to eastbound, steady energy must be flowing in the westbound direction from location G to location D in order that the front point of contact 78 of relay 6RTFSA in the energizing circuit for terminal 90 of the field station unit of Fig. 1*b* may be closed so that this terminal will be energized under the assumed condition. Accordingly, a code will be sent out from this field station to the control office of Fig. 1*a* so that relay 8WTK on the C. T. C. machine will be energized in order to permit a reversal of the polarized relay 8LPR which is controlled by the traffic lever 8. As previously pointed out, the steady energy will follow a train as it passes over the stretch, progressively energizing the track circuits and associated apparatus until when the train completely vacates the stretch, all of the track circuits will be reset on steady energy which is the normal condition of the system. The energizing circuit for terminal 90 of the field station unit also includes the back points of contacts 76 and 77 of code detecting relays 6RDR and 6RCDR (both deenergized since code is absent from section 6RT) and the front point of contact 79 of the westbound traffic direction control relay 8WFSR, in addition to the front point of contact 78 of relay 6RTFSA, mentioned above. Relay 8WFSR is still energized since the last traffic movement was westbound.

The preliminary movement of the traffic lever 8 results in the pick-up of both starting relays 234ST and 236ST which control the transmission of C. T. C. codes to the field stations 234 and 236 at locations D and G, respectively. The code transmission circuit for energizing the respective traffic direction control relay for the new direction will, however, not be completed until a reversal of the polar stick relay 8LPR which remains in its last energized position, is obtained. Under the condition assumed, relay 8LPR will receive reverse energization over the lever contact 8E (now closed), front contact 108 of relay 8WTK, and lever contact 109 (lever contact 109 having become closed during the preliminary movement of the lever 8). At this point it is advantageous to call attention to the traffic locking functions performed by the apparatus embodying my invention, with special reference to the apparatus of Fig. 1*a*. As will now be apparent, the westbound block indication relay 8WTK (or terminal 90 of the field station unit) cannot be energized unless the stretch is unoccupied and the westbound signal 10L is at stop so that westbound steady energy flows over the stretch. The energization of relay 8WTK closes front contact 182, and since polar contact 110 of relay 8LPR is in its right-hand position, the westbound traffic relay 8WFK is energized over an obvious circuit, closing a circuit over its front contact 120 for the westbound traffic direction light 8WFKE. If now a C. T. C. code is transmitted by the operator to location G for initiating the clearing of signal 10L, the steady energy will be removed from the stretch for reasons hereinbefore pointed out. The same will be true if the stretch is occupied, or the westbound steady energy is removed for any other reason. As a consequence, relay 6RTFSA will release, deenergizing terminal 90 and causing relay 8WTK to release. Accordingly, it is now no longer possible to reverse relay 8LPR even if the traffic lever itself is reversed to close contact 8E, because the reverse energization for relay 8LPR is interrupted at front contact 108 of relay 8WTK. It will be clear, therefore, that polar contact 110 is now locked in the right-hand position corresponding with westbound traffic so that no traffic reversal can be accomplished unless westbound steady energy is restored over the stretch. The westbound traffic relay 8WFK will, in the meantime have its stick circuit closed over polar contact 110 to the right, wire 183, and its own front contact 184 so as to maintain the westbound traffic direction indication during the time that signal 10L is clear or the stretch is occupied by a westbound train. It will be apparent, therefore, that the apparatus embodying my invention provides a highly effective, yet relatively simple form of traffic locking which prevents interference with authorized movement of traffic or the reversal of traffic direction when such reversal cannot be properly and safely accomplished.

Continuing now with the previous description in which a reversal of relay 8LPR has been obtained, contact 110 of relay 8LPR is now closed in the reverse or left-hand position and since relay 236S is now energized, energy is supplied to terminal 104 of the office unit which terminal corresponds with the similarly numbered terminal of the Lewis patent. The circuit for terminal 104 includes polar contact 110 in its left-hand position, wire 185, and front contact 186 of relay 236S, now closed. Energization of terminal 104 results in the transmission of a code which causes pick-up of the eastbound traffic direction control relay 8EFSR at the field station 236 at location G. When relay 8EFSR picks up following the movement of lever 8 to its R position, the steady energy previously supplied at location G over the back point of its contact 25 will be discontinued and will be replaced by code supplied over the front point of contact 25, as before. When relay 8WFSR at the other end becomes deenergized, steady energy will be supplied at location D, as previously explained.

Referring again to the intermediate signal location E, the foregoing reversal of lever 8 to its eastbound position will produce the following circuit operations. The steady energy which was previously applied at location G when the traffic direction was westbound caused relays 7ETR, 7ETFSA and 7WCTM to be steadily energized. When the change to code supplied at location G occurs, relays 7TM, 7BSA, 7HR, and 7ES will also become energized. Relay 7WCTM will now operate on code, its circuit including the back point of contact 73 of relay 7WTFSA, wire 111, contact 112 of code transmitter 180CT, front point of contact 62 of relay 7HR, and the back contact 63 of relay 7WS. The code operation of relay 7WCTM will cause code to be supplied to section 6RT beyond the intermediate signal 7W.

Considering now the other end of the stretch at location D where steady energy is now being applied because of the release of relay 8WFSR, the application of this steady energy will also be detected at the intermediate signal location E by the steady energization of relays 7WTR and 7WTFSA since the steady energy will feed through the code during the off intervals, as previously pointed out. Pick-up of the latter relay opens the circuit for relay 7WCTM, thus removing code from section 6RT. The pick-up of relay 7WTFSA also opens the circuits of relays 7ES, 7TM, 7BSA, and 7HR, whereupon relay 7ECTM will become steadily energized and will relay the steady energy from section 6RT into sections 7RT and 10LT. The steady energy circuit for relay 7ECTM includes the front point of contact 73 of relay 7WTFSA, back points of contacts 76 and 68 of relays 7WS and 7HR, respectively, and back contact 69 of relay 7ES. The steady energization of relay 7ECTM results in the obvious deenergization of relays 7ETR and 7ETFSA. Accordingly, the stretch has now been reset on eastbound steady energy so that the operator may initiate clearing of the eastbound signal 6R to permit an eastbound train to enter the stretch.

The operation of the apparatus at the intermediate signal location when an easbound train moves over the stretch is similar to the previously described operation for a westbound train movement, so that this description need not be repeated. Also, the operation of the apparatus at the cut section location will be clear from the previous description without added explanation.

I shall next describe the block indication features of my invention, considering first that the stretch has no intermediate signals, as will be the case when Figs. 1*a*, 1*b*, and 1*d* are placed end to end. Figs. 1*b* and 1*d* of the drawings, when Fig. 1*c* covering the intermediate signal location is inserted therebetween, show the block indication apparatus for a stretch of track having one intermediate signal and this indication apparatus has already been described. Figs. 2*a* and 2*b* show the modifications required in the control for the track indication relays 8WTK and 8ETK, respectively, when no intermediate signals are involved as is the case when Fig. 1*c* is removed from the stretch. Referring to Fig. 2, with steady energy in the track being supplied at location G and feeding westbound, as will be the case for westbound traffic, a circuit for causing energization of the westbound track indication relay 8WTK located at the control office will be completed over the back point of contact 113 of relay 6RCDR and the front points of contacts 114 and 115 of relays 6RTFSA and 8WFSR, respectively, to terminal 90 of the field station unit. As pointed out hereinbefore, energization of terminal 90 causes the transmission of a code from the field station to the control office to cause energization of relay 8WTK. Relay 8ETK (Fig. 2*b*) responsive to code from the opposite end of the stretch is, of course, deenergized at this time. Accordingly, the circuit for the block light which includes back contacts 116 and 117 of relays 8WTK and 8ETK, respectively, is incomplete so that the block light is dark and the indication is unoccupied block.

When code is applied at location D and transmitted over the stretch for a westbound move, a circuit will be effective for energizing terminal 90 of the field station unit 236 at location G over the front point of contact 118 of code detecting relay 10LCDR (now energized) to cause the energization of relay 8ETK at the control office through the transmission of a suitable C. T. C. code. Relay 8WTK will at this time be deenergized because of the deenergization of terminal 90 of the field station unit 234 resulting from the removal of steady energy from the track. Accordingly, the circuit for the block light will again be incomplete so that the indication is unoccupied block. If a westbound train should now enter the block, relay 10LCDR will be deenergized and so will complete a circuit over the back point of its contact 118 and the back point of contact 119 of relay 10LTFSA (now also deenergized) so as to energize terminal 94 of the field station unit which results in the transmission of a C. T. C. code to deenergize relay 8ETK at the office. With relays 8WTK and 8ETK both released, the circuit for the block light will be completed at back contacts 116 and 117 so that the block light will now indicate occupancy of the single track stretch.

Considering next the traffic indication, it is unimportant as to which of the two traffic directional control relays (8WFSR or 8EFSR) is operated first when the traffic direction is changed from westbound to eastbound, as the final circuit condition will be such that relays 6RCDR, 6RTFSA, and 8WFSR will all be deenergized so that a circuit will be completed for energizing terminal 94 of the field station unit 234 so as to cause deenergization of relay 8WTK at the office. On the other hand, relays 10LTFSA and 8EFSR will be energized so that a circuit will be completed for energizing the terminal 90 of the field station unit 236 so as to energize relay 8ETK. The time required to complete these relay operations and the order in which the indication codes are transmitted may produce a condition such that the block light may be illuminated for a short interval of time even though the block is then unoccupied. This type of indication will ordinarily not persist for more than a very few seconds unless the indication codes are delayed by control codes which receive preference in transmission.

The reversal of the polar contact 110 of relay 8LPR when the traffic direction was changed from westbound to eastbound opened the circuit for the westbound traffic relay 8WFK whereupon the opening of front contact 120 of this relay caused the westbound traffic indication light 8WFKE to become extinguished.

The energization of relay 8ETK with the polar contact 110 of relay 8LPR closed to the left (for eastbound traffic) completes the circuit for the eastbound traffic indication relay 8EFK over its front contact 121. The latter relay, in turn, closes its front contact 122 to illuminate the eastbound traffic direction light 8EFKE. Relay 8EFK is provided with a stick circuit over its own front contact 123 and wire 185 so that it will remain energized as long as relay 8LPR has its contact 110 closed to the left for the eastbound traffic direction. This provision is expedient since relay 8ETK will become deenergized when a control is transmitted to clear the 6R signals and eastbound steady energy is discontinued.

Where the stretch includes one pair of intermediate signals the block indication will be provided by the apparatus shown in Figs. 1*b* and 1*d*, as previously pointed out. This apparatus is the same as that shown in Figs. 2*a* and 2*b* and described above, with the exception that since one pair of intermediate signals is present within the stretch, the 180 code decoding relays (6RDR and 10LDR) at the two ends of the stretch are used in the circuits for energizing the terminal 90 of the respective field station unit, to pick up the track indication relay, and in the circuits for energizing terminal 94 which causes a release of this relay. The circuit change occasioned by the addition of relays 6RDR and 10LDR will, accordingly, be clear from the drawings without added description. As before, relays 8WTK and 8ETK will detect the unoccupied condition of the stretch when steady energy is present thrughout the stretch.

If the stretch includes more than one pair of intermediate signals, line wire circuits may be used as shown in Fig. 2*c* to repeat portions of the stretch to provide controls equivalent to those shown in Figs. 1*b* and 1*d*. Fig. 2*c* shows the use of such line wire circuits for two sets of intermediate signals. In this figure, the contacts 124 and 125 of relays "A" and "B" would be substituted for contacts 76 and 126, respectively, of the corersponding relays 6RDR and 10LDR of Figs. 1*b* and 1*d*, respectively. In all other respects, the control circuits for relays 8WTK and 8ETK will remain as in Figs. 1*b* and 1*d*.

Referring to Fig. 1*g*, the apparatus shown in this figure is similar to that shown in Fig. 1*c* with the exception that instead of using two neutral directional stick relays WS and ES, one for each direction, I employ a single directional stick relay DS. This relay is of the polar stick type and operates its polar contact 170 to the left when energized with current of one polarity over a circuit which includes the back point of contact 171 of relay WTFSA, front contact 172 of relay HR, and the front point of contact 173 of relay ETFSA. When the traffic direction is reversed, relay DS will open contact 170 and will close its polar contact 174 to the right by virtue of an energizing circuit which includes the back point of contact 173 of relay ETFSA, front contact 172 of relay HR, and front point of contact 171 of relay WTFSA. Polar contacts 170 and 174 control the application of code for a westbound or an eastbound following train movement, respectively, in a manner which will be clear from the previous description.

Referring next to Fig. 3*a*, this figure shows the apparatus embodying my invention applied to the control of an electric switch lock within the single track stretch, the lock being associated with an intermediate signal. The various relays in this figure carry similar designations to those used for the relays in Figs. 1*b*, 1*c*, and 1*d*, and these relays perform broadly the same functions so that it will be necessary to describe only those features wherein the apparatus of the present figure differs from that of Fig. 1. It will be understood, of course, that Fig. 3*a* can be substituted, for example, for Fig. 1*c*, or inserted between Fig. 1*c* and either Fig. 1*b* or 1*d* to provide a complete, operative system for electric switch lock control. The switch lock lever 7 shown in the control office apparatus of Fig. 1*a* is provided for the purpose of effecting such control when the apparatus of Fig. 3*a* forms a part of the single track system.

In the system embodying my invention, a train on the main track may secure an unlock automatically and enter the siding without any additional action being required on the part of the operator at the control office. In this case, the unlock is obtained when the train occupies the short releasing track section OT which may be of the order of 100 or 150 feet in length. The circuit for energizing the switch lock 7BW includes the back contact 127 of the track relay OTR for the section OT and the reverse contact 128 (now open) of the manually operable lever 7A which the trainman operates before an unlock is obtained. The trainmen will reverse both levers 7A and 7B, allowing a train to enter the siding, whereupon both of these levers should be restored to the normal position, as shown, unless the train is to leave before the arrival of another train. The purpose served by lever 7A will be explained in connection with the operation involved in obtaining an unlock to permit a train to leave the siding. This operation will now be described.

In order to render the switch lock operation more readily understandable, I shall assume that Fig. 3*a* has been substituted for Fig. 1*c* in the system of Fig. 1 and shall first point out briefly the main steps taking place during the operation of obtaining an unlock. The action of throwing the bolt lock lever 7A cuts off the steady energy (assumed flowing westbound) at the track switch location, resulting in current of 75 code feeding back from the west end to the switch location, and also lighting the block light on the operator's control panel. Obviously, unless steady energy is present at the track switch location, throwing the bolt lock lever 7A will have no effect.

The illumination of the block light indicates to the operator that the bolt lock has been thrown, and that he may reverse the switch lock lever 7 at the control office. This operation transmits a C. T. C. code to location G (the field station where the steady energy originates) for the purpose of cutting off the steady energy at that location and applying 75 code. When code is received from both directions at the switch location, the electric lock becomes energized so that the track switch may now be reversed.

I shall now describe the operation more in detail. As pointed out above, in order to secure an unlock for a train on the siding, the trainman will first operate lever 7A. It is assumed that traffic has been established in the westbound direction and that steady energy is being fed in the westbound direction from one end of the stretch through the switch lock location to the other end. Traffic should ordinarily be set in the direction of train movement in order to provide intermediate signal control. However, the system will operate satisfactorily with traffic established in either direction. The reversal of lever 7A under the assumed condition results in the deenergization of relay OTWM through the opening of contact 129 of lever 7A (which is closed only in the normal position of lever 7A), as will be obvious from the drawings. Relay OTWM, in releasing, opens the circuit for relay WCTM so that the steady energy is cut off from section WT and any other sections west of the intermediate signal location. Coded energy will then be applied to the track at the west end of the block (location D of Fig. 1b) in the usual manner and this energy will be detected by relay WHR adjacent the switch lock location. This coded energy will, however, not be relayed eastward, because relay ECTM also has its energizing circuit open at the front contact 130 of relay OTWM. The latter relay has been provided with a stick circuit to insure that it will not be deenergized should lever 7A be reversed during a time when coded energy is effective in the track circuits and an entrance signal is clear, or a train is approaching the lock. In either case, it would be undesirable to interrupt the coded track circuit energy with the possibility of interfering with the train movement. The normal pick-up circuit for relay OTWM includes the armature contact 131 of lock 7BW, the normal contacts 132 and 129 of levers 7B and 7A, respectively, front contact 133 of relay OTR, winding of relay OTWM, front contact 134 of relay OTR, and normal contact 135 of lever 7B. The stick circuit for relay OTWM includes armature contact 131, normal contact 132 of lever 7B, wires 136 and 137, front contacts 138 and 139 in multiple of relays EHR and WHR, respectively, wire 140, front contact 141 of relay OTWM, and wire 142. It will be apparent that front contact 141 in this circuit bypasses the normal contact 129 of lever 7A. Contacts 132 and 135 of lever 7B can be the usual switch circuit controller contacts and need not require a separate lever such as 7B.

After the trainman has operated lever 7A under the proper conditions, the operator at the control office will send a control code to both ends of the stretch with the switch lever 7 in the control office in its unlocked (R) position. Accordingly, the switch control relay 7RWSR (Fig. 1d) at the entrance end of the block corresponding with the established traffic direction (westbound) will become energized snce the eastbound traffic direction control relay 8EFSR is now deenergized and has its back contact 143 closed. Relay 7RWSR at the other end of the block (location D) will not become energized because the westbound traffic direction control relay 8WFSR is energized under the assumed condition of westbound traffic and has its back contact 168 open.

The control circuit for relay 7RWSR includes, in addition to the back contact 143 of relay 8EFSR, the front contact 144 of relay 10LKM, back contact 145 of relay 10LSR, and back contact 146 of the time element release 7TER. Front contact 144 of relay 10LKM checks that the entrance signals are at stop. Back contact 145 of the directional stick relay 10LSR prevents the energization of relay 7RWSR if relay 10LSR is energized. This provision makes it possible for coded energy to be received after the train passes the first intermediate signal to deenergize relay 10LSR, after which steady energy would normally be applied to the track circuit and transmitted in the westbound direction. Back contact 146 of the time element release 7TER checks that this relay is in its fully released position so that a full time interval will be measured by the relay, when energized. Relays 7TER and 7TESR are required only when switch locks are located at automatic signals (as in Fig. 3a), and in this case only at the east end of the block. Thus, these timing relays are only required at the east end of the block when it is possible for a train leaving a siding equipped with an electric switch lock to pass an intermediate signal and then move past an intermediate signal in the opposite direction. The end of the block toward which such a train movement could be made is the one which would require the timing relays TER and TESR.

The energization of relay 7RWSR at location G changes the control circuit of relay 10LTCTM from steady energy to code. This control circuit now includes the 75 code terminal, back point of contact 147 of relay 10RAHR, back contact 56 of relay 10LTFSA, wire 189, front point of contact 23 of relay 7RWSR, back contact 24 of relay 10LHSR, back point of contact 35 of relay 8EFSR, back contact 26 of relay 10 LSR, and front contacts 27 and 28 of relays 9TM and 10LKM. Relay 10LTCTM will now apply coded energy to the track at location G and this energy will be fed in the westbound direction toward the switch lock location. When this code is detected at the switch lock location by virtue of the energization of relay EHR, the switch lock circuit will become completed over a path which includes the front point of contact 148 of relay WHR, wire 149, front contact 150 of relay EHR, wires 151 and 152, and reverse contact 128 of lever 7A.

It will be noted that in the case of the intermediate signal type of switch lock location, as shown in Fig. 3a, the circuit for the electric switch lock 7BW includes front contacts 153 and 154 of the eastbound and westbound directional stick relays ES and WS, in multiple with front contacts 150 and 148, respectively, of relays EHR and WHR. Accordingly, with this arrangement, an unlock could be obtained at lock 7BW following the movement of a westbound train past the intermediate signal W.

After the unlock has been obtained and the switch has been reversed, the unlock control may be cancelled by transmitting a C. T. C. code, with lever 7 in the normal position, to deenergize relay 7RWSR at location G, thus completing a circuit for the thermal time element relay 7TER over the back contact 155 of relay 7RWSR and the back point of contact 156 of relay 7TESR which became deenergized when relay 7RWSR was energized. After the expiration of the required time interval, the front contact 157 of relay 7TER will close and will complete an obvious energizing circuit for relay 7TESR. Pick-up of relay 7TESR will open the circuit for relay 7TER at the back point of contact 156, thus permitting the thermal relay to cool and to reclose its checking contact 146 in the previously traced circuit for relay 7RWSR. Relay 7TESR will remain energized until such time as relay 7RWSR is reenergized for another unlock of the electric switch lock.

If the train leaving the siding were to move in the eastbound direction while a westbound train occupied the block west of the switch lock, the operator at the control office would leave lever 7 in the reverse position so as to feed coded track circuit energy toward the train, as mentioned hereinbefore, in order that the intermediate signals may display proceed aspects. If the block were unoccupied, the operator would have established the eastbound direction of traffic so that the train could proceed east in the usual manner and lever 7 could be restored to its normal position at any time after the switch became unlocked.

In view of the explanation which has been presented above in connection with the apparatus of Fig. 3a for obtaining an unlock of a switch lock at an intermediate signal location, it is believed that the operation of the apparatus of Fig. 3b will be entirely clear from the drawings. This figure shows the switch lock 7BW positioned at a cut section location so that a considerable portion of the apparatus of Fig. 3a can be dispensed with in Fig. 3b. All of the steps involved in the switch lock operation are the same in both cases, so that a detailed description of the operation is unnecessary. The chief difference resides, of course, in the absence of the directional stick relays ES and WS; the repeating relays ETM and WTM; and the decoding apparatus which provides selective control of the intermediate signal indications. Relay OTWM is again provided with a stick circuit which prevents release of this relay by a reversal of lever 7A at a time when coded energy flows in either direction over the stretch. The code detection in Fig. 3b is accomplished by relays ETBSA and WTBSA which will not be energized unless the respective track relay ETR or WTR is following code. When code is present, the stick circuit of relay OTWM will accordingly include one or the other front contacts 190 or 191 of relays ETBSA and WTBSA, respectively, instead of the corresponding contacts 138 or 139 of relays EHR and WHR, respectively, in Fig. 3a. The normal pick-up circuit for relay OTWM is the same in both figures. It is apparent, therefore, that the apparatus lends itself readily to the control of switch locks either at an intermediate signal location or at a cut section location.

In either of the foregoing arrangements, the switch lock lever 7 in the control office may be restored to its normal position at any time after the track switch has been reversed. This is possible because the track switch does not have to be unlocked in order to be thrown to normal. An unlock of the switch can also be obtained (following a reversal of lever 7A) if the short detector section OT immediately in advance of the switch is shunted, releasing relay OTR which closes an auxiliary pick-up circuit for lock 7BW over its back contact 127, wire 152, and reverse contact 128 of lever 7A. This provision makes it possible for a train occupying the main single track stretch to enter a siding at any time.

Referring next to the highway crossing modification shown in Fig. 4, I employ neutral direct current track circuits for the approach control of the highway crossing operating circuits and for the short track circuit through the crossing. The operation of the highway crossing stick relays WSR and ESR and of the highway crossing signals will be effected in the usual and well-known manner. It will be understood, also, that Fig. 4 of the drawings showing the highway crossing modification of my invention may be inserted between any two sheets of the system shown in Fig. 1 of the drawings, such as between Figs. 1b and 1c, Figs. 1c and 1d, or between any of these figures and Fig. 3a or Fig. 3b when the stretch includes a track switch location. As will be apparent from the drawing of Fig. 4, the steady energy and track code of my system are carried around the approach sections at the highway crossing location over line wires which include front contacts of the track relays for these sections.

The operation is as follows, assuming that Fig. 4 is inserted between Figs. 1b and 1d. When steady energy is being received from location G of Fig. 1d and transmitted westbound, the code following track relay ETR will be continuously energized, as will also the code transmitting relay WCTM. The circuit for relay WCTM passes over the line wires and includes the front points of contacts 158 and 159 of relay ECTM, front contacts 160 and 161 of track relay AETR, front contacts 162 and 163 of track relay OTR, back contacts 164 and 165 of the stick relays ERS and WSR, respectively, front contacts 166 and 167 of track relay AWTR, and the back points of contacts 168 and 169 of relay WTR. The energization of relay WCTM applies steady energy to the track circuit WT west of the crossing location in the usual manner. When steady energy is removed at location G, as it will be when the westbound entrance signal is cleared, relay WCTM (and relay ETR) will become deenergized, thus permitting the code following track relay WTR to respond to code which is now being transmitted eastward from location D, since the traffic direction is assumed to be westbound. The code operation of relay WTR will now cause relay ECTM to follow code and to repeat this code into the track section ET east of the crossing. The coding circuit for relay ECTM includes the front points of coding contacts 168 and 169 of relay WTR, the line circuit previously traced for relay WCTM, and the back points of contacts 158 and 159 of relay ETR. It will be apparent, therefore, that the presence of the highway crossing location within the single track stretch does not interfere in any manner with the transmission of either the steady energy or the coded energy which are used in establishing traffic in one or the other direction through the stretch. Also, there is no interference with the restoration of the system to its normal condition following the passage of a train over the stretch.

It will be noted that the line circuit in Fig. 4 is so controlled by the eastbound and westbound track relays that the two line wires transmit steady energy in one or the other direction according as the eastbound or the westbound track relay is steadily energized, and the same two line wires transmit code in the other or the one direction according as the westbound or the eastbound track relay, respectively, is following code. The positive and negative source terminals (B and C, respectively) at the two ends of the line circuit are connected in reverse order, so that when relay WTR is energized, the upper wire 193 has the positive energy terminal B connected thereto, whereas when relay ETR is energized, this wire is connected with the negative energy terminal C. The same is true for the lower wire 194 to which relay ETR connects positive energy and relay WTR connects negative energy. Since the operation of the system is such that relays WTR and ETR are never up at the same time, short circuits other than those which might be caused by flashover at the contacts cannot develop, so that a single source could be used, if desired, for supplying energy at both ends of the line circuit. In order to decrease the possibility of excess current flowing should flashover occur at the contacts of either relay ETR and WTR, I have provided a resistor 192 in the line circuit. This resistor is of insufficient value to interfere with proper energization of relays ECTM and WCTM, but provides adequate protection against the possibility of an injurious short circuit.

It will be clear from the foregoing that by means of a novel and relatively simple line circuit control arrangement, I have made provision for safe and effective control of highway crossing locations occurring within the single track stretch of my system.

In all of the track circuits which I have shown, with the exception of the highway crossing track circuits and the detector track circuits at track switch locations, I employ track relays (TR) having only a single contact finger which operates a repeater relay (TM) having the required number of contacts. The reason why I prefer to use a single point track relay is that this relay can be designed to have greater shunting sensitivity, thus permitting the operation of much longer track circuits than would be possible, for example, with a four point relay. It will be apparent, however, that where the track circuits need not be of extreme length, the repeater relay of the track relay may be dispensed with entirely, the track relay itself being equipped with the necessary number of contacts.

Lighting of the various signals in my system may be accomplished in the usual manner which is well known. It is intended, however, that the lever-controlled headblock signals at the ends of the sidings will be normally lighted, whereas the automatic intermediate signals will be normally dark but will become illuminated when an entrance signal is cleared or a train is approaching the intermediate signal location.

In describing the operation of the cut section apparatus at location F of Fig. 1c, a front contact coding cut section was used. By this is meant that repeating of the code around the cut section is accomplished over one or more front contacts. This type of cut section is satisfactory where the code received by a track relay is directly repeated into another track circuit and the total length of the track circuits which are so controlled, including the first one, is not excessive. However, the variation in track relay energization resulting from variation in track ballast resistance may be considerable in long track circuits, so that the time during which a front contact of a track relay is closed on code will appreciably increase when the relay is overenergized, resulting in distortion of the repeated code. This distortion may be cumulative when the code is repeated over several cut sections by front contact coding, and may under certain conditions exceed the limits for proper operation of the decoding equipment.

To avoid this difficulty, a back contact coding cut section such as I have shown in Fig. 5 may be used. This type of cut section has a corrective characteristic in that it repeats short "on" periods as long "off" periods, and short "off" periods as long "on" periods. Accordingly, the distortion of code received by the first track section will be compensated for, or largely corrected, by the use of the back contact coding cut section apparatus. The operation of this apparatus will be clear from the drawings so that only a brief explanation of the repeating circuits will be given. It will be noted that I have provided each track relay with an FSA relay which is energized when its track relay is operated either by steady energy or by code, and with a BSA relay which is operated only when the track relay is following code. In this manner, selective control is provided, depending upon whether steady energy or coded energy is to be repeated over the cut section. When relay ETR is steadily energized, for example, a steady energy circuit for relay WCTM is closed over the back contact 195 of relay ETBSA and the front contact 196 of relay ETFSA. When relay ETR follows code, the code repeating circuit for relay WCTM includes the back point of contact 197 of relay ETR, front contacts 198 and 199 of relays ETBSA and ETFSA, respectively, and back contact 200 of relay WTFSA. Corresponding circuits are effective for operating relay ECTM on steady energy or code, according as relay WTR is steadily energized or is following track circuit code.

Referring next to Fig. 1e which shows a modified form of the traffic direction control and traffic locking apparatus of Fig. 1a, the apparatus of this figure is quite similar to that shown in Fig. 1a, the chief difference residing in the manner in which the polar stick relay 8LPR is controlled, as well as the manner in which this relay controls the selective energization of the traffic direction control relays at the two ends of the stretch. With traffic assumed westbound and steady energy being received at the exit end (stretch unoccupied and both opposing headblock signals at stop), the westbound traffice relay 8WFK will be energized so that its front contact 201 is closed. Since the traffic lever 8 occupies its normal position (traffic westbound), its contact 8W is closed so that polar relay 8LPR is energized in the normal direction and contact 110 occupies its right-hand position, as shown. Accordingly, the circuit for energizing terminal 102 is effective as soon as the starting button on lever 8 is depressed (so that relays 234ST and 234S are picked up). As pointed out hereinbefore, energization of terminal 102 is effective in energizing the westbound traffic direction control relay 8WFSR.

A reversal of lever 8, closing contact 8E, will be effective for reversing relay 8LPR since the left-hand winding of this relay will receive energy over front contact 201 of relay 8WFK and contact 8E of the lever. With relay 8LPR reversed, an energizing circuit for terminal 104 will be effective whenever the starting button is depressed, whereupon the eastbound traffic direction control relay 8EFSR will be energized to effect the traffic direction reversal in the manner previously explained. The apparatus of Fig. 1e also employs a polar stick traffic indication relay 8FK controlled to one or the other position over a front contact 202 or 203 of the associated relay 8WFK or 8EFK. Polar contact 204 of relay 8FK controls the westbound and eastbound traffic indication.

One operating difference between the apparatus of Fig. 1e and Fig. 1a is that in the latter, the energizing circuit for one or the other winding of relay 8LPR is checked over a contact (108) of its corresponding indicating relay only, but not over both indicating relays, as in Fig. 1e. Accordingly, in Fig. 1a, a reversal of relay 8LPR cannot be obtained unless the steady energy is received at the end of the stretch corresponding with the established traffic direction. Also, in Fig. 1a, the initial energizing circuit for terminal 102 or 104 includes a front contact (122 or 121) of the corresponding indication relay. Thus, neither traffic direction control relay can be energized from the office unless an indication is received, and this indication must correspond with the established traffic direction. It will be clear, therefore, that the apparatus of Fig. 1e will operate satisfactorily, but that additional refinements and checks have been introduced into the apparatus of Fig. 1a.

Fig. 1f shows a further modification of the apparatus of Fig. 1a. The apparatus of Fig. 1f eliminates the polar stick relay 8FK of Fig. 1e, but is in other respects quite similar to the latter figure in is operation. That is to say, relay 8LPR will reverse following a reversal of lever 8, irrespective of the direction in which the steady energy is flowing at the time, since either front contact 205 or 206 of relays 8WTK and 8ETK, respectively, can close the circuit for relay 8LPR. Also, the energization of terminals 102 and 104 is not checked over the contacts of the respective indication relays, as it is in Fig. 1*a*. It will be noted that the stick circuit for relay 8WFSR over its front contact 207 can be maintained closed independently of the energization of terminal 86 by means of C. T. C. code from the control office. This is also true of the stick circuit for relay 8WFSR in Fig. 1*a* wherein the corresponding contacts are similarly numbered. In this manner, when steady energy is absent at the west end (after relay 8WFSR has been picked up) back contact 208 of relay 6RTFSA will be closed and will maintain the stick circuit for relay 8WFSR effective so that manipulation of the traffic lever 8 at the office will have no effect until steady energy is restored at the west end. A similar stick circuit is effective in maintaining relay 8EFSR at the east and end energized independently of the C. T. C. code equipment when steady energy is absent from that end.

From the foregoing description it will be apparent that I have provided a safe, flexible, and economical system for controlling traffic over a stretch of single track from a central control office without control line wires except for the C. T. C. line circuit. I employ steady energy for maintaining the system in its normal, inactive condition, transmitting this steady energy over the track selectively in one direction or the other, in accordance with the traffic direction. Receipt of the steady energy at the exist end of the stretch provides the block unoccupied indication and permits initiation of the clearing operation for the entrance signal when a move in the established direction is to be made. This operation removes the steady energy and permits track circuit code to be transmitted from the exit end to the entrance end to clear the entrance signal and permit traffic to enter. When the train accepts the signal and enters the stretch, steady energy is re-applied behind the train, unless the entrance signal is re-cleared for a following move. The steady energy progressively resets the track circuits until, after the stretch is completely vacated, the system is restored to its normal condition. Before a reversal of the established traffic direction can be made, the train must have completely vacated the stretch, as indicated by the receipt of steady energy at the exit end. A traffic lever reversal at the control office will now be effective for exercising control over the traffic direction control relays. When the traffic direction control relay for the established traffic direction is deenergized and the control relay for the new traffic direction is energized, the previously applied steady energy will be discontinued and steady energy will be applied at the new entrance end and will be transmitted to the new exit end, thereby providing the block unoccupied indication, as before. From this point on, the steps involved in the operation of clearing the entrance signal and resetting the system on steady energy after the stretch is vacated are the same as described immediately above. The apparatus at the control office is so arranged that no reversal of the established traffic direction can be accomplished unless the stretch is unoccupied and the entrance headblock signals are at stop, as evidenced by the receipt of steady energy at the exit end. This traffic locking arrangement prevents interference with authorized traffic once an entrance signal is cleared and a train accepts the signal. Electric switch lock control is accomplished in a simple and flexible manner by first checking unoccupancy with the steady energy and then feeding track circuit code from both directions toward the track switch location whereupon an unlock can be obtained. Highway crossing locations can likewise be readily and safely incorporated into the system embodying my invention.

Although I have herein shown and described only a few forms of railway traffic controlling apparatus embodying my invention, it is understood that various changes and modifications may be made therein within the scope of the appended claims without departing from the spirit and scope of my invention.

Having thus described my invention what I claim is:

1. In combination with a stretch of single track over which traffic may move in either direction, said stretch being divided into a plurality of track circuit sections, an eastbound and a westbound traffic direction control relay adjacent the east and the west end respectively of said stretch, means effective when said eastbound traffic relay is deenergized and said stretch is unoccupied for relaying uncoded rail current over said sections from said east end to said west end for providing an unoccupied block indication, a stick relay adjacent said east end, a track relay adjacent said west end responsive to said uncoded current, means effective for energizing said stick relay to thereby interrupt the supply of said uncoded rail current and release said track relay, means for energizing said westbound traffic direction relay, means effective when said track relay is released and said westbound traffic relay is energized for relaying coded rail current over said sections from said west end to said east end, and traffic governing means responsive to the receipt of said coded rail current at said east end.

2. In combination with a stretch of single track over which traffic may move in either direction, said stretch being divided into a plurality of track circuit sections, an eastbound and a westbound traffic direction control relay adjacent the east and west and respectively of said stretch, means for selectively operating said relays, means including a back contact of said eastbound traffic relay for normally transmitting uncoded rail current over said sections from said east end to said west end, a track relay adjacent said west end responsive to said uncoded current, a westbound entrance signal normally at stop, means for interrupting the supply of said uncoded current to thereby release said track relay, means including a front contact of said westbound traffic relay effective when said track relay is released for transmitting coded rail current over said sections from said west end to said east end, and means responsive to the receipt of said coded current at said east end for clearing said entrance signal.

3. In combination with a stretch of single track over which traffic may move in either direction, a traffic direction control relay adjacent one end of said stretch, an entrance signal adjacent the other end of said stretch, means adjacent said other end effective when said stretch is unoccupied and said entrance signal is at stop for transmitting uncoded rail current from said other end to said one end of the stretch, a control relay adjacent said one end operated by said uncoded current and effective when operated for providing an unoccupied block indication for said stretch, means for interrupting the supply of said uncoded current to thereby release said control relay, means for operating said traffic direction control relay, means effective when said traffic direction control relay is operated and said control relay is released for transmitting coded rail current from said one end to said other end of the stretch, and means effective when said coded current is received at said other end for clearing said entrance signal to thereby permit traffic to enter said stretch.

4. In combination with a stretch of single track over which traffic may move in either direction, a traffic direction control relay adjacent one end of said stretch, an entrance signal adjacent the other end of said stretch, means adjacent said other end effective when said stretch is unoccupied and said entrance signal is at stop for transmitting uncoded rail current from said other end to said one end of the stretch, a control relay adjaecnt said one end operated by said uncoded current and effective when operated for providing an unoccupied block indication for said stretch, means for interrupting the supply of said uncoded current to thereby release said control relay, manually controlled means at a control office for operating said traffic direction control relay, means effective when said traffic direction control relay is operated and said control relay is released for transmitting coded rail current from said one end to said other end of the stretch, and means effective when said coded current is received at said other end for clearing said entrance signal to thereby permit traffic to enter said stretch.

5. In combination with a stretch of track over which traffic may move in either direction, a traffic direction control relay adjacent one end of said stretch, means adjacent the other end effective when said stretch is unoccupied for transmitting uncoded rail current from said other end to said one end of the stretch for detecting unoccupancy, uncoded current detecting means adjacent said one end, means for interrupting the supply of said uncoded current to thereby cause a response of said uncoded current detecting means, means for operating said traffic direction control relay, means effective when said traffic direction control relay is operated and said detecting means has responded to the interruption of said uncoded energy for transmitting coded rail current from said one end to said other end of the stretch, and means effective when said coded current is received at said other end for permitting traffic to enter said stretch.

6. In combination with a stretch of track over which traffic may move in either direction, a traffic direction control relay adjacent one end of said stretch, means adjacent the other end effective when said stretch is unoccupied for transmitting rail current of a first character from said other end to said one end of the stretch for detecting unoccupancy, detecting means adjacent said one end responsive to current of said first character, means for interrupting said current to thereby release said detecting means, means for operating said traffic direction control relay, means effective when said traffic direction control relay is operated and said detecting means is released for transmitting rail current of a second character from said one end to said other end of the stretch, and means adjacent said other end selectively responsive to rail current of said second character for permitting traffic to enter said stretch.

7. In combination with a stretch of track over which traffic may move in either direction, a traffic direction control relay adjacent one end of said stretch, means adjacent said other end effective when said stretch is unoccupied for transmitting rail current of a first character from said other end to said one end of the stretch for detecting unoccupancy, detecting means adjacent said one end responsive to current of said first character, means for interrupting said current to thereby release said detecting means, manually controlled means at a control office for operating said traffic direction control relay, means effective when said traffic direction control relay is operated and said detecting means is released for transmitting rail current of a second character from said one end to said other end of the stretch, and means adjacent said other end selectively responsive to rail current of said second character for permitting traffic to enter said stretch.

8. In combination with a stretch of single track over which traffic may move in either direction, an eastbound and a westbound traffic direction control relay adjacent the east and the west end respectively of said stretch, means including a back contact of said eastbound traffic relay for transmitting uncoded rail current from said east end to said west end of the stretch for providing an unoccupied block indication, traffic reversal means effective when said uncoded current is received at said west end for permitting energization of said eastbound traffic relay to thereby interrupt the supply of said uncoded current at said east end and for permitting deenergization of said westbound traffic relay to thereby cause uncoded rail current to be transmitted from said west end to said east end of the stretch, detecting means adjacent said east end responsive to the receipt of said uncoded rail current at that end, means for interrupting the supply of said uncoded current at said west end to thereby release said detecting means, means including a front contact of said eastbound traffic relay effective when said detecting means is released for transmitting coded rail current from said east end to said west end, and traffic governing means responsive to the receipt of said coded rail current at said west end.

9. In combination with a stretch of single track over which traffic may move in either direction, a traffic direction control relay adjacent each end of said stretch one of which is normally energized and the other of which is normally deenergized, means governed over a back contact of the normally deenergized traffic relay for supplying said stretch with uncoded rail current transmitted in the established traffic direction from one to the other end of said stretch for checking unoccupancy and for permitting a reversal of said traffic direction, means effective when said uncoded current is received at said other end for permitting energization of said normally deenergized traffic relay to interrupt the supply of said uncoded current at said one end and for permitting deenergization of said normally energized traffic relay for supplying said stretch with uncoded rail current transmitted in the reverse traffic direction from said other to said one end of the stretch, detecting means adjacent said one end responsive to the receipt of said uncoded current at said one end, means for interrupting the supply of said uncoded current at said other end to thereby release said detecting relay, means including a front contact of the traffic relay adjacent said one end effective when said detecting means is released for transmitting coded rail current from said one end to said other end, and traffic governing means responsive to the receipt of said coded rail current at said other end.

10. In combination with a stretch of single track over which traffic may move in either direction, an eastbound and a westbound traffic direction control relay, manually controlled means at a control office for deenergizing one said traffic relay and energizing the other traffic relay to thereby establish traffic in a given direction over said stretch, means controlled over a back contact of the deenergized traffic relay for transmitting uncoded rail current from one to the other end of the stretch in said given direction to thereby detect unoccupancy of said stretch, detecting means responsive to the receipt of said uncoded current at said other end, means for interrupting the supply of said uncoded current at said one end to thereby release said detecting means, means governed over a front contact of said energized traffic relay and effective when said detecting relay is released for transmitting coded rail current from said other end to said one end of the stretch, and traffic governing means responsive to the receipt of said coded rail current at said one end.

11. In combination with a stretch of single track over which traffic may move in either direction, means for transmitting uncoded rail current in a given direction from one to the other end of said stretch, manually controlled means at a control office for establishing traffic in said given direction, block detection apparatus at said control office responsive to the receipt of said uncoded current at said other end, said manually controlled means operating to interrupt the supply of said uncoded current at said one end and to transmit coded rail current from said other end to said one end of the stretch to thereby permit traffic to enter the stretch at said one end, and means governed by said block detection apparatus effective for preventing the supply of said coded current at said other end to thereby prevent traffic from entering said stretch unless said block detection apparatus has first responded to said uncoded current as a check on the unoccupied condition of said stretch.

12. In combination with a stretch of single track over which traffic may move in either direction, a normally deenergized traffic direction control relay adjacent one end of said stretch, means controlled over a back contact of said traffic relay for transmitting uncoded rail current from one to the other end of said stretch, manually controlled means at a control office for energizing said traffic relay to establish traffic in a given direction over said stretch, block detection apparatus at said control office responsive to the receipt of said uncoded current at said other end, said manually controlled means operating to interrupt the supply of said uncoded current at said one end and to transmit coded rail current from said other end to said one end of the stretch to thereby permit traffic to enter the stretch at said one end, and means at said control office governed by said block detection apparatus for preventing energization of said traffic relay to thereby prevent traffic from entering said stretch unless said block detection apparatus has first responded to said uncoded current as a check on the unoccupied condition of said stretch.

13. In combination with a stretch of single track over which traffic may move in either direction, a first normally deenergized traffic direction control relay adjacent one end of said stretch, a second normally energized traffic direction control relay adjacent the other end of said stretch, manually controlled means for energizing said first relay and for deenergizing said second relay, means effective when said second relay is deenergized for transmitting uncoded rail current from said other end to said one end of said stretch for detecting unoccupancy, detecting means adjacent said one end responsive to said uncoded current, an entrance signal adjacent said other end, manually controlled means effective when said detecting means has responded for discontinuing the supply of said uncoded current to release said detecting means, means effective when said first relay is energized and said detecting means is released for transmitting coded rail current from said one end to said other end, and means responsive to the receipt of said coded current at said other end for clearing said entrance signal.

14. In combination with a stretch of single track over which traffic may move in either direction, said stretch including a first and a second track circuit section and a normally deenergized intermediate signal, means for transmitting uncoded rail current over said sections from one to the other end of the stretch for detecting unoccupancy, block indication apparatus responsive to the receipt of said uncoded current at said other end, manually controlled means governed by said block indication apparatus for transmitting coded rail current over said sections from said other end to said one end to permit a train to enter said stretch and occupy said first section, said coded current causing energization of said intermediate signal, means effective after the train has passed out of said first section into said second section for restoring said uncoded current to said first section to thereby restore said intermediate signal to its deenergized condition, and means effective after the train has vacated said stretch for restoring said uncoded current at said other end to thereby again cause response of said block indication apparatus and so detect unoccupancy of said stretch.

15. In combination with a stretch of track over which traffic may move in either direction, a first normally energized traffic direction control relay adjacent one end of said stretch and a second normally deenergized traffic direction control relay adjacent the other end of said stretch, a first normally energized code repeating relay adjacent said other end having an energizing circuit on uncoded current which includes a back contact of said second traffic relay, a second normally deenergized code repeating relay adjacent said one end, a track relay adjacent said one end having an energizing circuit which includes a back contact of said second code repeating relay, means including a front contact of said first code repeating relay for supplying uncoded rail current at said other end, means for transmitting said uncoded current to said one end to thereby steadily energize said track relay, means for discontinuing the supply of said uncoded rail current to thereby deenergize said track relay, means including a front contact of said first traffic relay effective when said track relay is deenergized for transmitting coded rail current from said one to said other end of the stretch, and traffic governing means responsive to the receipt of said coded rail current at said other end of the stretch.

16. In combination with a stretch of track over which traffic may move in either direction, a first normally energized traffic direction control relay adjacent one end of said stretch and a second normally deenergized traffic direction control relay adjacent the other end of said stretch, means including a back contact of said second traffic relay for transmitting uncoded rail current from said other end to said one end of the stretch for checking unoccupancy, a code following track relay adjacent said one end steadily energized on said uncoded current, means for discontinuing said uncoded current to thereby release said track relay, means including a front contact of said first traffic relay effective when said track relay is deenergized for transmitting coded current from said one to said other end of said stretch to permit traffic to enter at said other end, means effective when said stretch is unoccupied for energizing said second traffic relay to thereby transmit coded rail current from said other end to said one end and so to reverse the established traffic direction, said track relay operating on the coded current transmitted to said one end, and means controlled by said track relay when operating on said coded current for permitting traffic to enter said stretch at said one end.

17. In combination with a stretch of track over which traffic may move in either direction, a first normally deenergized traffic direction control relay adjacent one end of said stretch and a second normally energized traffic direction control relay adjacent said other end of the stretch, manually controlled means effective for energizing said first direction control relay and deenergizing said second direction control relay, means effective when said second direction control relay is deenergized for transmitting uncoded rail current from said other end to said one end of said stretch, a normally deenergized detecting relay adjacent said one end energized in response to the receipt of said uncoded current at said one end, means for energizing said first direction control relay, means for deenergizing said detecting relay following the receipt of said uncoded current at said one end, means effective when said first direction control relay is energized and said detecting relay is deenergized for transmitting coded rail current from said one end to said other end, and traffic governing means responsive to the receipt of said coded rail current at said other end.

18. In combination with a stretch of track over which traffic may move in either direction, means for transmitting uncoded rail current from one to the other end of said stretch for detecting unoccupancy and for maintaining traffic established in a given direction over said stretch, a normally deenergized traffic direction control relay adjacent said one end, a detecting relay adjacent said other end energized in response to the receipt of said uncoded current at said other end, means at a control office for closing a pick-up circuit for said direction control relay for initiating a reversal of said given traffic direction, and a stick circuit for said direction control relay effective when said detecting relay is deenergized, whereby said direction control relay cannot be deenergized from said control office to initiate restoration of said given traffic direction unless said stretch is unoccupied and said detecting relay is energized.

19. In combination with a stretch of track over which traffic may move in either direction, means for transmitting uncoded rail current from one to the other end of said stretch for detecting unoccupancy and for maintaining traffic established in a given direction over said stretch, a normally deenergized traffic direction control relay adjacent said one end, a detecting relay adjacent said other end energized in response to the receipt of said uncoded current at said other end, means at a control office for closing a pick-up circuit for said direction control relay for initiating a reversal of said given traffic direction, and a stick circuit for said direction control relay including a back contact of said detecting relay and a front contact of said direction control relay, whereby the latter relay cannot be deenergized from said control office to initiate restoration of said given traffic direction unless said stretch is unoccupied and said detecting relay is energized.

20. In combination with a stretch of track over which traffic may move in either direction, said stretch including a track switch, an electric switch lock for said track switch, a first track circuit section on one side of the track switch location and a second track circuit section on the other side of the track switch location both within said stretch, means for transmitting uncoded rail current in the normal direction from said first to said second section for detecting unoccupancy, manually controlled means effective when said stretch is unoccupied for discontinuing said uncoded current in said second section and energizing the second section with coded rail current transmitted in the reverse direction toward said track switch location, manually controlled means effective when said coded current is present in said second section for discontinuing said uncoded current in said first section and energizing the first section with coded rail current transmitted in the normal direction toward said track switch location, detecting means for each said section responsive to coded rail current in its associated section, and means controlled by both said detecting means for permitting an unlock of said electric switch lock.

21. In combination with a stretch of track over which traffic may move in either direction, said stretch including a track switch, an electric switch lock for said track switch, a first track circuit section on one side of the track switch location and a second track circuit on the other side of the track switch location, both within said stretch, means for transmitting uncoded rail current in the normal direction from said first to said second section for detecting unoccupancy, manually controlled means adjacent said track switch location effective when said stretch is unoccupied for discontinuing said uncoded current in said second section and energizing the section with coded rail current transmitted in the reverse direction toward said track switch location, manually controlled means adjacent one end of said stretch effective when said coded current is present in said second section for discontinuing said uncoded current in said first section and energizing the first section with coded rail current transmitted in the normal direction toward said track switch location, detecting means for each said section responsive to coded rail current in its associated section, and means controlled by both said detecting means for permitting an unlock of said electric switch lock.

22. In combination with a stretch of track over which traffic may move in either direction, a traffic governing device for permitting entry of traffic into said stretch from a location intermediate the two ends of the stretch, a track circuit junction adjacent said traffic governing device for establishing a first and a second track circuit section, means for transmitting uncoded rail current in the normal direction from said first to said second section for detecting unoccupancy, detecting means for detecting the receipt of said uncoded current in said second section, means controlled by said detecting means for substituting coded rail current for uncoded current in said second section, means effective when coded current is present in said second section for substituting coded rail current for uncoded current in said first section, code detecting means for each said section responsive to coded rail current in its associated section, and means controlled by both said code detecting means for permitting operation of said traffic governing device.

23. In combination with a stretch of track over which traffic may move in either direction, a traffic governing device for permitting entry of traffic into said stretch from a location intermediate the two ends of the stretch, a track circuit junction adjacent said traffic governing device for establishing a first and a second track circuit section, means for transmitting uncoded rail current in the normal direction from said first to said second section for detecting unoccupancy, detecting means for detecting the receipt of said uncoded current in said second section, manually controlled means governed by said detecting means for substituting coded rail current for uncoded current in said second section, manually controlled means effective when coded current is present in said second section for substituting coded rail current for uncoded current in said first section, code detecting means for each said section responsive to coded rail current in its associated section, and means controlled by both said code detecting means for permitting operation of said traffic governing device.

24. In combination with a stretch of track over which traffic may move in either direction, said stretch including a track switch, a normally deenergized electric switch lock for locking said track switch in its normal position, a first track circuit section on one side of the track switch location and a second track circuit section on the other side of the track switch location both within said stretch, a detector track circuit between said two sections, means for transmitting uncoded rail current over both said sections for detecting unoccupancy, manually controlled means adjacent said track switch location for discontinuing said uncoded current in one of said sections and for preparing a first energizing circuit for said switch lock effective when said detector track circuit becomes occupied, means effective when said uncoded current is discontinued in said one section for energizing said one section with coded rail current, means effective when coded current is present in said one section for substituting coded rail current for uncoded current in the other section, and a second energizing circuit for said switch lock effective when coded current is present in both said sections.

25. In combination with a stretch of track over which traffic may move in either direction, a traffic governing device located intermediate the two ends of said stretch, a first section comprising a combined eastbound and westbound track circuit including the same track rails of said stretch and controlling the approach to said device from a given traffic direction, a second section comprising a combined eastbound and westbound track circuit including the same track rails of the stretch and controlling the approach to said device from the other traffic direction, means for transmitting uncoded rail current over said two sections for detecting unoccupancy, means effective when both said sections are unoccupied for substituting coded rail current for uncoded current in said first section, means effective when coded current is present in said first section for substituting coded rail current for uncoded current in said second section, detecting means for each said section responsive to coded rail current in its associated section, and means controlled by both said detecting means for permitting operation of said traffic governing device.

26. Traffic locking means for a stretch of single track over which traffic may move in either direction comprising, in combination, a traffic direction control relay for each direction of traffic for establishing the respective traffic direction over said stretch, means controlled by one or the other of said relays for transmitting uncoded rail current in one or the other direction respectively over said stretch, a traffic direction control lever for said stretch having a normal and a reverse position, a polarized stick relay controlled to its normal or its reverse position in accordance with the position of said lever, a first and a second indication relay for the ends of said stretch selectively energized when and only when said uncoded current is received at the associated end, a normal energizing circuit for said stick relay including a normal contact of said lever and a front contact of said first indication relay, a reverse energizing circuit for said stick relay including a reverse contact of said lever and a front contact of said second indication relay, and means governed by said stick relay for selectively controlling the energization of said one or said other traffic direction control relay according as said stick relay is energized to its normal or its reverse position respectively.

27. Traffic locking means for a stretch of single track over which traffic may move in either direction comprising, in combination, means for transmitting uncoded rail current in one or the other direction over said stretch in accordance with the direction of the last train movement over the stretch, a first and a second indication relay for the ends of said stretch selectively energized when and only when said uncoded current is received at the associated end, a polar stick relay having a normal and a reverse position, a normal energizing circuit for said polar stick relay including a front contact of said first indication relay, a reverse energizing circuit for said polar stick relay including a front contact of said second indication relay, and means selectively controlled by said polar stick relay in accordance with said normal and said reverse position for governing traffic in said one or said other direction over said stretch.

28. Traffic locking means for a stretch of single track over which traffic may move in either direction comprising, in combination, means for transmitting uncoded rail current from one to the other end of said stretch, an indication relay at a control office energized when and only when said uncoded current is received at said other end, a stick relay also at the control office having an energizing circuit which is effective only when said indication relay is energized, means governed by said stick relay for establishing traffic in a given direction over said stretch, and means for preventing a reversal of said traffic direction unless said stick relay is first energized.

29. Traffic locking means for a stretch of single track over which traffic may move in either direction comprising, in combination, means for transmitting rail current from one to the other end of said stretch, an indication relay at a control office energized when and only when said current is received at said other end, a stick relay also at the control office having an energizing circuit which is effective only when said indication relay is energized, means governed by said stick relay for establishing traffic in a given direction over said stretch, and means for preventing a reversal of said traffic direction unless said stick relay is first energized.

30. Traffic locking means for a stretch of single track over which traffic may move in either direction comprising, in combination, means for transmitting rail current from one to the other end of said stretch, an indication relay at a control office energized when and only when said current is received at said other end, a stick relay also at the control office having an energizing circuit including a front contact of said indication relay, and traffic direction control means governed by a contact of said stick relay closed when said stick relay is energized.

31. Traffic locking means for a stretch of single track over which traffic may move in either direction comprising, in combination, means for transmitting rail current in one or the other direction over said stretch in accordance with the direction of the last train movement over the stretch, a first and a second indication relay for the ends of said stretch selectively energized when and only when said current is received at the associated end, a traffic direction selector controlled to a normal or a reverse position respectively according as said first or said second indication relay is energized, means for indicating when traffic is established in one direction over said stretch controlled by a normal contact of said selector and a front contact of said second indication relay, and means for indicating when traffic is established in the other direction over said stretch controlled by a reverse contact of said selector and a front contact of said first indication relay.

32. Traffic locking means for a stretch of single track over which traffic may move in either direction comprising, in combination, means for transmitting rail current in one or the other direction over said stretch in accordance with the direction of the last train movement over the stretch, a first and a second track indication relay for the ends of said stretch selectively energized when and only when said current is received at the associated end, a polar stick relay energized to a normal or a reverse position over a front contact of said first or said second track indication relay respectively, a traffic indication relay for one traffic direction energized over a normal contact of said polar stick relay and a front contact of said second track indication relay, and a traffic indication relay for the other traffic direction energized over a reverse contact of said polar stick relay and a front contact of said first track indication relay.

33. Traffic locking means for a stretch of single track over which traffic may move in either direction comprising, in combination, means for transmitting rail current in one or the other direction over said stretch in accordance with the direction of the last train movement over the stretch, a first and a second track indication relay for the ends of said stretch selectively energized when and only when said current is received at the associated end, a polar stick relay energized to a normal or a reverse position over a front contact of said first or said second track indication relay respectively, a traffic indication relay for one traffic direction energized over a normal contact of said polar stick relay and a front contact of said second track indication relay, a traffic indication relay for the other traffic direction energized over a reverse contact of said polar stick relay and a front contact of said first track indication relay, and a stick circuit for each traffic indication relay excluding the front contact of the associated track indication relay and including the associated contact of said polar stick relay and a front contact of the associated traffic indication relay.

34. Traffic locking means for a stretch of single track over which traffic may move in either direction comprising, in combination, means for transmitting rail current in one or the other direction over said stretch in accordance with the direction of the last train movement over the stretch, a first and a second indication relay for the ends of said stretch selectively energized when and only when said current is received at the associated end, a traffic lever having a normal and a reverse position, a polar stick traffic direction control relay, a normal and a reverse energizing circuit for said polar stick relay selectively closed over the normal or the reverse contact of said lever respectively and including a front contact of said first or said second indication relay in parallel, and traffic direction control means selectively governed by a polar contact of said polar stick relay.

35. Traffic locking means for a stretch of single track over which traffic may move in either direction comprising, in combination, means for transmitting rail current in one or the other direction over said stretch in accordance with the direction of the last train movement over the stretch, a first and a second indication relay for the ends of said stretch selectively energized when and only when said current is received at the associated end, a traffic lever having a normal and a reverse position, a polar stick traffic direction control relay, a normal and a reverse energizing circuit for said polar stick relay selectively closed over the normal or the reverse contact of said lever respectively and including a front contact of said first or said second indication relay in parallel, traffic direction control means selectively governed by a polar contact of said polar stick relay, and a polar stick traffic indication relay having a normal and a reverse energizing circuit selectively governed over a front contact of said first or said second indication relay.

36. Traffic locking means for a stretch of single track over which traffic may move in either direction comprising, in combination, means for transmitting rail current in one or the other direction over said stretch in accordance with the direction of the last train movement over the stretch, a first and a second track indication relay for the ends of said stretch selectively energized when and only when said current is received at the associated end, a traffic lever having a normal and a reverse position, a polar stick traffic direction control relay, a normal and a reverse energizing circuit for said polar stick relay selectively closed over the normal or the reverse contact of said lever respectively and including a front contact of said first or said second track indication relay in parallel, and traffic direction control means selectively governed by said polar stick relay.

37. In combination with a stretch of track over which traffic may move in either direction, said stretch being intersected by a highway, an approach track section at each side of said highway intersection, a line circuit comprising a first and a second line wire for by-passing rail current around said two approach sections, a first track section adjoining the approach section at one side of the highway, a second track section adjoining the other approach section at the other side of the highway, a code following track relay and a code repeating relay for each said first and said second sections, means including the back contacts of each said track relay for connecting the associated code repeating relay with said line circuit, means including the front contacts of each said track relay for connecting a source of current across said line circuit, means including a back contact of each said code repeating relay for connecting the associated track relay across the rails of its associated track section, and means including a front contact of each said code repeating relay for connecting a source of track circuit current across the rails of its associated track section.

38. In combination witih a stretch of track over which traffic may move in either direction, said stretch being intersected by a highway, an approach track section at each side of said highway intersection, a line circuit comprising a first and a second line wire for by-passing rail current around said two approach sections, a first track section adjoining the approach section at one side of the highway, a second track section adjoining the other approach section at the other side of the highway, a code following track relay and a code repeating relay for each said first and said second section, means including the back contacts of each said track relay for connecting the associated code repeating relay with said line circuit, means including the front contacts of each said track relay for connecting a source of current across said line circuit, means including a back contact of each said code repeating relay for connecting the associated track relay across the rails of its associated track section, means including a front contact of each said code repeating relay for connecting a source of track circuit current across the rails of its associated track section, a track relay for each of said approach sections, and highway crossing apparatus controlled over a front contact of each said last-named track relay.

39. In combination with a stretch of track over which traffic may move in either direction, said stretch having a cut section location defining a first and a second adjoining track section, a code following track relay and a code repeating relay for each said section, a slow acting front contact repeater relay for each said section energized over a front point of its associated track relay, a slow acting back contact repeater relay for each said section energized over a back point of its associated track relay and a front point of the associated front contact repeater relay, a first energizing circuit for each said code repeating relay including a front point of the front contact repeater relay and a back point of the back contact repeater relay both associated with the other of said two sections, a second energizing circuit for each said code repeating relay including a back point of the track relay and a front point of the back contact repeater relay both associated with the other of said two sections as well as a back point of the front contact repeater relay associated with its own section, means including a back point of each said code repeating relay for connecting the associated track relay across the rails of its associated track section, and means including a front point of each said code repeating relay for connecting a source of track circuit current across the rails of its associated track section.

40. In combination with a stretch of track over which traffic may move in either direction, said stretch having a cut section location defining a first and a second adjoining track section, a code following track relay and a code repeating relay for each said section, a slow acting front contact repeater relay for each said section energized over a front point of its associated track relay, a code detecting relay for each said section energized in response to code operation of its associated track relay but not to steady energization thereof, a first energizing circuit for each said code repeating relay including a front point of the front contact repeater relay and a back point of the code detecting relay both associated with the other of said two sections, a second energizing circuit for each said code repeating relay including a back point of the track relay and a front point of the code detecting relay both associated with the other of said two sections as well as a back point of the front contact repeater relay associated with its own section, means including a back point of each said code repeating relay for connecting the associated track relay across the rails of its associated track section, and means including a front point of each said code repeating relay for connecting a source of track circuit current across the rails of its associated track section.

41. In combination with a stretch of track over which traffic may move in either direction, means for normally transmitting uncoded rail current from one to the other end of said stretch, means for discontinuing the supply of said uncoded current and transmitting coded rail current from said other end to said one end of said stretch to permit traffic to enter at said one end, means for re-applying uncoded rail current at said one end during the time that said coded current is being supplied at said other end, said uncoded current being effective at said other end during off intervals in said coded current, and means responsive to the receipt of said uncoded current at said other end for discontinuing the supply of said coded current to thereby restore said stretch to its normal condition.

42. In combination with a stretch of track over which traffic may move in either direction, means for normally transmitting uncoded rail current from one to the other end of said stretch when traffic conditions are in the normal direction to check unoccupancy of said stretch, means for discontinuing the supply of said uncoded current and transmitting coded current from said one to said other end of the stretch when traffic conditions are reversed, a first relay adjacent said other end energized in response to the receipt of said uncoded current at said other end, a second relay also adjacent said other end energized in response to the receipt of said coded but not said uncoded current at said other end, and block detection apparatus for said normal direction governed over a front contact of said first relay and a back contact of said second relay.

43. In combination with a stretch of track over which traffic may move in either direction, means for normally transmitting uncoded rail current from one to the other end of said stretch when traffic conditions are in the normal direction to check unoccupancy of said stretch, means for discontinuing the supply of said uncoded current and transmitting coded current from said one to said other end of the stretch when traffic conditions are reversed, a first relay adjacent said other end energized in response to the receipt of said uncoded current at said other end, a second relay also adjacent said other end energized in response to the receipt of said coded but not said uncoded current at said other end, block detection apparatus for said normal direction governed over a front contact of said first relay and a back contact of said second relay, and an auxiliary circuit for governing said block detection apparatus including a front contact of said second relay.

44. In combination with a stretch of track over which traffic may move in either direction, said stretch including an intermediate signal location defining two track sections within said stretch, means for normally transmitting uncoded rail current over said sections from one to the other end of said stretch when traffic conditions are in the normal direction to check unoccupancy of said stretch, means for discontinuing the supply of said uncoded current and transmitting coded rail current from said one to said other end of the stretch when traffic conditions are in the reverse direction, said coded current being of the approach code in the first section at said one end and of the clear code in the second section at said other end, said clear code in said second section being changed to approach code after a train enters said first section and vacates said second section, a first relay adjacent said other end energized in response to the receipt of said uncoded current at said other end, a second relay also adjacent said other end energized in response to the receipt of either said approach code or said clear code at said other end, a third relay also adjacent said other end energized in response to the receipt of said clear code but not said approach code at said other end, and block detection apparatus for said normal direction governed over a front contact of said first relay and a back contact of each said second and said third relay.

45. In combination with a stretch of track over which traffic may move in either direction, said stretch including an intermediate signal location defining two track sections within said stretch, means for normally transmitting uncoded rail current over said sections from one to the other end of said stretch when traffic conditions are in the normal direction to check unoccupancy of said stretch, means for discontinuing the supply of said uncoded current and transmitting coded rail current from said one to said other end of the stretch when traffic conditions are in the reverse direction, said coded current being of the approach code in the first section at said one end and of the clear code in the second section at said other end, said clear code in said second section being changed to approach code after a train enters said first section and vacates said second section, a first relay adjacent said other end energized in response to the receipt of said uncoded current at said other end, a second relay also adjacent said other end energized in response to the receipt of either said approach code or said clear code at said other end, a third relay also adjacent said other end energized in response to the receipt of said clear code but not said approach code at said other end, block detection apparatus for said normal direction governed over a front contact of said first relay and a back contact of each said second and said third relay, and an auxiliary circuit for governing said block detection apparatus including a front contact of said third relay.

46. In combination with a stretch of track over which traffic may move in either direction, said stretch including at least two intermediate signal locations defining at least three track sections within said stretch, means for normally transmitting uncoded rail current over said sections from one to the other end of said stretch when traffic conditions are in the normal direction to check unoccupancy of said stretch, means for discontinuing the supply of said uncoded current and transmitting coded current from said one to said other end of the stretch when traffic conditions are in the reverse direction, said coded current being of the approach code in the first section at said one end and of the clear code in the second and third sections, said clear code in said third section being changed to approach code after a train enters said second section and vacates said third section, said clear code in said second section being changed to approach code after a train enters said first section and vacates said second section, a first relay adjacent said other end energized in response to the receipt of said uncoded current at said other end, a second relay also adjacent said other end energized in response to the receipt of either said approach code or said clear code at said other end, a third relay adjacent the first intermediate signal location from said other end energized in response to the receipt of said clear code but not said approach code at said first intermediate signal location, an auxiliary relay controlled over a line circuit which includes a front contact of said second relay and a front contact of said third relay, and block detection apparatus for said normal direction governed over a front contact of said first relay and a back contact of each said second and said auxiliary relay.

47. In combination with a stretch of track over which traffic may move in either direction, said stretch including at least two intermediate signal locations defining at least three track sections within said stretch, means for normally transmitting uncoded rail current over said sections from one to the other end of said stretch when traffic conditions are in the normal direction to check unoccupancy of said stretch, means for discontinuing the supply of said uncoded current and transmitting coded current from said one to said other end of the stretch when traffic conditions are in the reverse direction, said coded current being of the approach code in the first section at said one end and of the clear code in the second and third sections, said clear code in said third section being changed to approach code after a train enters said second section and vacates said third section, said clear code in said second section being changed to approach code after a train enters said first section and vacates said second section, a first relay adjacent said other end energized in response to the receipt of said uncoded current at said other end, a second relay also adjacent said other end energized in response to the receipt of either said approach code or said clear code at said other end, a third relay adjacent the first intermediate signal location from said other end energized in response to the receipt of said clear code but not said approach code at said first intermediate signal location, an auxiliary relay controlled over a line circuit which includes a front contact of said second relay and a front contact of said third relay, block detection apparatus for said normal direction governed over a front contact of said first relay and a back contact of each said second and said auxiliary relay, and an auxiliary circuit for governing said block detection apparatus including a front contact of said auxiliary relay.

48. In combination with a stretch of track over which traffic may move in either direction, said stretch including a track switch, a detector section adjacent said track switch location, a first track section adjoining said detector section at one side thereof, a second track section adjoining said detector section at the other side thereof, an electric lock for said track switch, a track relay for said detector section, a repeater relay for said track relay, means for transmitting coded rail current over said stretch in one or the other direction according as normal or reverse traffic direction is established over said stretch, a first code detecting relay energized in response to the presence of said coded current in said first section when traffic is in the normal direction, a second code detecting relay energized in response to the presence of said coded current in said second section when traffic is in the reverse direction, a manually operable switch lock lever having a first contact closed in the normal position and having a second contact closed in the reverse position of said lever, an energizing circuit for said electric lock including said second contact of the lever and a front contact of each said first and said second detecting relay; an energizing circuit for said repeater relay including a back contact of said electric lock, said first contact of the lever, and a front contact of said track relay; and a stick circuit for said repeater relay excluding said first contact of the lever and including a front contact of each said first and second detecting relay and a front contact of said repeater relay.

49. In combination with a stretch of track over which traffic may move in either direction, said stretch including a track switch, an electric switch lock for said track switch, means for transmitting uncoded rail current from one to the other end of said stretch to detect unoccupancy, indication means at a control office energized in response to the receipt of said uncoded current at said one or said other end of said stretch, manually controlled means at said control office effective when said indication means has been energized for transmitting coded rail current from said one end of the stretch and from said other end of the stretch to said track switch location, and means effective when said coded currents are both received adjacent the track switch location for providing an unlock of said electric switch lock.

50. In combination with a stretch of track over which traffic may move in either direction, said stretch including a track switch, a detector section adjacent said track switch location, a first track section adjoining said detector section at one side thereof, a second track section adjoining said detector section at the other side thereof, an electric lock for said track switch, a track relay for said detector section, a repeater relay for said track relay, means for transmitting coded rail current over said stretch in one or the other direction according as normal or reverse traffic direction is established over said stretch, a first code detecting relay energized in response to the presence of said coded current in said first section when traffic is in the normal direction, a second code detecting relay energized in response to the presence of said coded current in said second section when traffic is in the reverse direction, a manually operable switch lock lever having a first contact closed in the normal position and having a second contact closed in the reverse position of said lever, a directional stick relay for each said first and said second section for controlling traffic in said normal and said reverse direction respectively; an energizing circuit for said electric lock including front contacts of said two detecting relays in series, each of said front contacts having a front contact of the associated directional stick relay in multiple therewith; an energizing circuit for said repeater relay including a back contact of said electric lock, said first contact of the lever, and a front contact of said track relay; and a stick circuit for said repeater relay excluding said first contact of the lever and including a front contact of each said first and said second detecting relay and a front contact of said repeater relay.

51. In combination with a stretch of single track two-direction railway, a traffic governing device located intermediate the two ends of said stretch and dividing said stretch into a first and a second portion, means for transmitting uncoded rail current over both portions of said stretch to detect unoccupancy thereof, means effective when said uncoded current is detected in said second portion for transmitting coded rail current over said second portion of the stretch toward said device, means effective when said coded current is present in said second portion for transmitting coded rail current over said first portion of the stretch also toward said device, detecting means for each said coded rail current, and means governed by both said detecting means for providing control of said traffic governing device.

52. In combination with a stretch of single track two-direction railway, a traffic governing device located intermediate the two ends of said stretch and dividing said stretch into a first and a second portion, means for transmitting uncoded rail current over both portions of said stretch in a direction determined in accordance with the direction of traffic established over said stretch to detect unoccupancy thereof, means effective when said coded current is detected in said second portion for transmitting coded rail current over said second portion of the stretch toward said device, means effective when coded current is present in said second portion for transmitting coded rail current over said first portion of the stretch also toward said device, detecting means for each said coded rail current, and means governed by both said detecting means for provided control of said traffic governing device.

53. In a coded track circuit centralized traffic control system for a stretch of single track having a highway crossing with highway crossing protection signals associated therewith, an approach track section having a steadily energized track relay and located on each side of said highway crossing for operating the crossing signals when a train is approaching the crossing in either direction, means manually controlled from a remote control office for transmitting driven code pulses over the track rails of said stretch in either selected direction towards said approach track sections, a pair of line wires having their continuity controlled by the track relays of both of said approach sections for communicating driven code pulses received from either end of the stretch around both of said approach track sections toward the other end of the stretch, and code responsive means at each end of said stretch associated with signals governing traffic thereover and each being at times controlled by driven codes transmitted in part over track rails of said stretch and in part over said pair of line wires.

JAMES J. VAN HORN.